United States Patent
Simonyi et al.

(10) Patent No.: US 10,387,547 B2
(45) Date of Patent: Aug. 20, 2019

(54) LAYOUT ENGINE FOR CREATING A VISUAL LAYOUT TREE FOR A DOCUMENT

(71) Applicant: Intentional Software Corporation, Bellevue, WA (US)

(72) Inventors: Charles Simonyi, Medina, WA (US); Paul J. Kwiatkowski, Redmond, WA (US); Jeremy M. Price, Kirkland, WA (US); Andras Nagy, Bellevue, WA (US); Nicholas J. Wilson, Seattle, WA (US); Alexander K. Horton, Seattle, WA (US)

(73) Assignee: INTENTIONAL SOFTWARE CORPORATION, Bellevue, WA (US)

( * ) Notice: Subject to any disclaimer, the term of this patent is extended or adjusted under 35 U.S.C. 154(b) by 110 days.

(21) Appl. No.: 14/800,628

(22) Filed: Jul. 15, 2015

(65) Prior Publication Data

US 2017/0017627 A1  Jan. 19, 2017
US 2017/0364491 A9  Dec. 21, 2017

Related U.S. Application Data

(60) Provisional application No. 62/285,003, filed on Sep. 9, 2014.

(51) Int. Cl.
G06F 17/22 (2006.01)
G06F 17/21 (2006.01)

(52) U.S. Cl.
CPC ........ *G06F 17/2247* (2013.01); *G06F 17/212* (2013.01); *G06F 17/218* (2013.01); *G06F 17/2288* (2013.01)

(58) Field of Classification Search
CPC ............ G06F 17/212; G06F 17/2247
(Continued)

(56) References Cited

U.S. PATENT DOCUMENTS 5,953,726 A   7/1999  Carter et al.
6,745,208 B2  6/2004  Berg et al.
(Continued)

FOREIGN PATENT DOCUMENTS

GB    2492096 A    12/2012

OTHER PUBLICATIONS

"Smart Caching for Web Browsers"; Zhang et al; <http://www.survey.ethz.ch/CDstore/www2010/www/p491.pdf>; Published: Apr. 30, 2010.*

(Continued)

*Primary Examiner* — Stephen S Hong
*Assistant Examiner* — Brederick C Anderson
(74) *Attorney, Agent, or Firm* — Talem IP Law, LLP

(57) ABSTRACT

A layout engine generates a visual layout tree for a visual description tree of a document whose content is to be rendered in one or more display areas. A visual description tree describes the content of a document along with formatting and logical arrangement the content. Visual description nodes of a visual description tree represent the organization of the constituent elements a document hierarchically. A visual layout tree defines the layout of a document within one or more display areas. Visual layout nodes of a visual layout tree represent the layout of the content of a document hierarchically. The layout engine receives as input a visual description tree and generates the corresponding visual layout tree. A rendering engine then inputs the visual layout tree and generates a graphics buffer containing the pixels representing the layout of the document as defined by the visual layout tree.

30 Claims, 23 Drawing Sheets

(58) Field of Classification Search
USPC .......................................................... 715/243
See application file for complete search history.

(56) References Cited

U.S. PATENT DOCUMENTS

| | | |
|---|---|---|
| 6,775,678 B1 | 8/2004 | Hillberg et al. |
| 7,194,679 B1 | 3/2007 | Green |
| 7,199,836 B1 | 4/2007 | Eleftheriadis et al. |
| 7,468,801 B2 | 12/2008 | Wakeam et al. |
| 8,307,300 B1 | 11/2012 | Fisher et al. |
| 8,683,314 B2 | 3/2014 | Berkner et al. |
| 8,751,922 B2 | 6/2014 | Epstein |
| 8,947,427 B2 | 2/2015 | Shuster et al. |
| 8,954,457 B2 | 2/2015 | Fablet et al. |
| 9,170,759 B2 | 10/2015 | Suga |
| 9,582,477 B2 | 2/2017 | McCoy et al. |
| 2002/0036662 A1 | 3/2002 | Gauthier et al. |
| 2002/0184264 A1 | 12/2002 | Berg et al. |
| 2003/0076329 A1 | 4/2003 | Beda et al. |
| 2003/0169295 A1 | 9/2003 | Becerra, Jr. |
| 2004/0194020 A1 | 9/2004 | Beda et al. |
| 2005/0044295 A1 | 2/2005 | Wakeam et al. |
| 2007/0038643 A1 | 2/2007 | Epstein |
| 2007/0168856 A1 | 7/2007 | Berkner et al. |
| 2008/0034292 A1 | 2/2008 | Brunner et al. |
| 2009/0177959 A1 | 7/2009 | Chakrabarti et al. |
| 2010/0013842 A1 | 1/2010 | Green et al. |
| 2011/0258532 A1 | 10/2011 | Ceze et al. |
| 2011/0289393 A1 | 11/2011 | Choi |
| 2012/0005242 A1 | 1/2012 | Feng et al. |
| 2012/0096341 A1 | 4/2012 | Suga |
| 2012/0254733 A1 | 10/2012 | Tucovic |
| 2012/0330984 A1 | 12/2012 | Fablet et al. |
| 2013/0044106 A1 | 2/2013 | Shuster et al. |
| 2013/0086005 A1 | 4/2013 | Mori |
| 2013/0328898 A1 | 12/2013 | Murthy et al. |
| 2014/0245133 A1 | 9/2014 | McCoy et al. |
| 2014/0258340 A1 | 9/2014 | Crowthers et al. |
| 2014/0330835 A1 | 11/2014 | Boyer |

OTHER PUBLICATIONS

"How Browsers Work: Behind the scenes of modern web browsers"; Garsiel et al; <https://www.html5rocks.com/en/tutorials/internals/howbrowserswork>; Published: Aug. 5, 2011.*
"What is Factory method Design Pattern in Java"; Javin Paul; JavaRevisited; <http://javarevisited.blogspot.com/2011/12/factory-design-pattern-java-exannple.html>; Published prior to Apr. 16, 2014 (Year: 2014).*
Zou, Jiu, et al., "Combining DOM Tree and Geometric Layout Analysis for Online Medical Journal Article Segmentation"; Joint Conference on Digital Libraries; 2006; Association for Computing Machinery.
U.S. Appl. No. 14/800,594; Charles Simonyi, et al., "Generating a Visual Layout Tree Based on a Named Point Within a Visual Description Node", filed Jul. 15, 2015.
U.S. Appl. No. 14/800,601; Charles Simonyi, et al., "Generating Visual Layout Nodes to Fill a Display Area Based on an Anchor Point", filed Jul. 15, 2015.
U.S. Appl. No. 14/800,619; Charles Simonyi, et al., "Generating a Visual Description Tree Based on a Layout Interruption Record", filed Jul. 15, 2015.
U.S. Appl. No. 14/800,615; Charles Simonyi, et al., "Generating a Visual Layout Tree Using Caching Techniques", filed Jul. 15, 2015.
U.S. Appl. No. 14/800,574; Charles Simonyi, et al., "Adding Visual Description Nodes to a Visual Description Tree During Layout", filed Jul. 15, 2015.
U.S. Appl. No. 14/800,609; Charles Simonyi, et al., "Linking Visual Layout Nodes of a Visual Layout Tree Using Positioning Pointers", filed Jul. 15, 2015.
U.S. Appl. No. 14/800,611; Paul J. Kwiatkowski, et al., "Detecting and Animating a Change in Position of a Visual Layout Node of a Visual Layout Tree", filed Jul. 15, 2015.
"Final Office Action Issued in U.S. Appl. No. 14/800,601", dated Nov. 2, 2017, 17 Pages.
"Non Final Office Action Issued in U.S. Appl. No. 14/800,601", dated Mar. 24, 2017, 17 Pages.
"Non Final Office Action Issued in U.S. Appl. No. 14/800,601", dated May 14, 2018, 17 Pages.
"Final Office Action Issued in U.S. Appl. No. 14/800,609", dated Aug. 9, 2018, 32 pages.
"Non-Final Office Action Issued in U.S. Appl. No. 14/800,609", dated Mar. 22, 2017, 15 Pages
"Non Final Office Action Issued in U.S. Appl. No. 14/800,611", dated Sep. 19, 2018, 34 Pages.
"Final Office Action Issued in U.S. Appl. No. 14/800,615", dated Aug. 10, 2018, 22 Pages.
"Non Final Office Action Issued in U.S. Appl. No. 14/800,619", dated Aug. 10, 2018, 14 pages.
"Non Final Office Action Issued in U.S. Appl. No. 14/800,574", dated Apr. 21, 2017, 10 Pages.
"Non Final Office Action Issued in U.S. Appl. No. 14/800,574", dated Jan. 25, 2018, 11 Pages.
"Non Final Office Action Issued in U.S. Appl. No. 14/800,609", dated Jan. 11, 2018, 22 Pages.
"Final Office Action Issued in U.S. Appl. No. 14/800,611", dated Jan. 11, 2018, 31 Pages.
"Non Final Office Action Issued in U.S. Appl. No. 14/800,611", dated Apr. 21, 2017, 22 Pages.
"Non Final Office Action Issued in U.S. Appl. No. 14/800,615", dated Jan. 27, 2017, 13 Pages.
"Non Final Office Action Issued in U.S. Appl. No. 14/800,615", dated Dec. 29, 2017, 19 Pages.
"Final Office Action Issued in U.S. Appl. No. 14/800,619", dated Feb. 23. 2018, 15 Pages.
"Non Final Office Action Issued in U.S. Appl. No. 14/800,619", dated Aug. 11, 2017, 13 Pages.
"Search Report Issued in European Patent Application No. 15771761. 2", dated Sep. 14, 2018, 7 Pages.
Hyatt, Dave, "WebCore Rendering 1-V", Retrieved From: https://webkit.org/blog/114/webcore-rendering-i-the-basics/, Aug. 8, 2007, 7 Pages.
Pohja, et al. , "CSS Layout Engine for Compound Documents", In Proceedings of the Third Latin American Web Congress, Jan. 1, 2005, 9 Pages.
"Office Action Issued in European Application No. 15771761.2", dated Mar. 19, 2019, 9 Pages.
"Non Final Office Action Issued in U.S. Appl. No. 14/800,611", dated May 2, 2019, 32 Pages.
"Final Office Action Issued in U.S. Appl. No. 14/800,574", dated May 2, 2019, 12 Pages.

* cited by examiner

LAYOUT ENGINE FOR CREATING A VISUAL LAYOUT TREE FOR A DOCUMENT

CROSS REFERENCE TO RELATED APPLICATION

The present application claims the benefit of U.S. Provisional Application Ser. No. 62/285,003 (previously U.S. Nonprovisional application Ser. No. 14/481,875) entitled "GENERATING A VISUAL LAYOUT TREE FROM A VISUAL DESCRIPTION TREE REPRESENTATION OF A DOCUMENT," filed on Sep. 9, 2014, which is incorporated herein in its entirety by reference.

BACKGROUND

Application programs, such as game applications, presentation applications, e-reader applications, computer-aided design applications, and editing applications, are generating increasingly complex and sophisticated content to be presented on a display of a computing device. For example, a game application may generate content showing movement of a firefighter through a burning building. A presentation application may generate content showing the unrolling of a scroll that contains a complex document with text and graphics in one portion of the display and the waving of a flag in another portion of the display. An e-reader application may generate content showing pages of a document with special effects such as animating the flipping of a page or many pages in rapid succession and displaying non-sequential pages of the document simultaneously in different display area. A computer-aided design application may generate content that animates movement of the internals of a complex machine, such as a car engine or a mechanical watch. An editing application may generate content that applies special effects to the editing process such as showing a deleted page spiraling into a trash can or animating the movement of an image from its current location in the document to a new location.

The presenting of such complex and sophisticated content can require considerable amount of computational resources. As a result, many low computational power devices such as e-readers and smartphones cannot present such content. The more complex content might only be effectively presented on displays of high-end workstations with significant computational power. Even with such significant computational power, it may not be possible to display complex content on a very large display such as the size of a wall or billboard with tens of millions of pixels. It would be desirable to have more efficient techniques for presenting such content.

DETAILED DESCRIPTION

Figure 1:
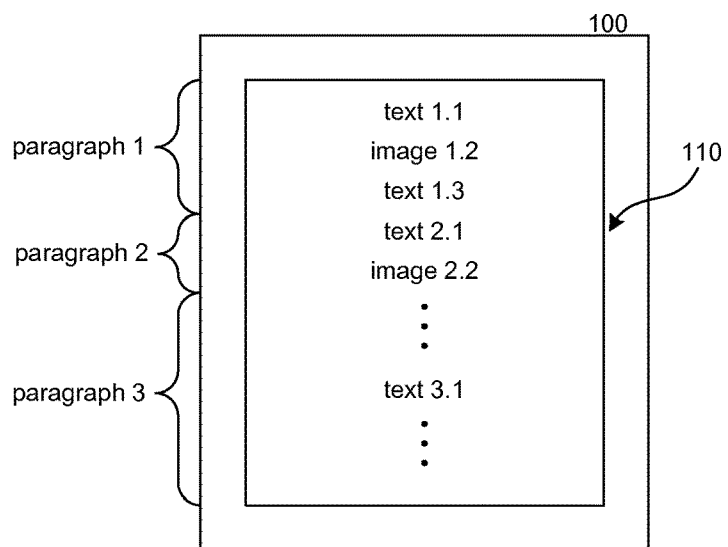
FIG. 1 illustrates the display of an example document within a display area that is large enough to display the entire content of the example document.

In some embodiments, a layout engine generates a visual layout tree for a visual description tree of a document whose content is to be rendered in one or more display areas. A visual description tree describes the content of a document along with formatting and logical arrangement the content. For example, a visual description tree may specify that a chapter of a document includes paragraphs of text and an embedded image. Visual description nodes of a visual description tree represent the organization of the constituent elements a document hierarchically. For example, a visual description tree may include a visual description node representing a chapter with a child visual description node for each constituent element (e.g., paragraph or image) of the chapter. A visual description node representing a paragraph may have a child visual description node defining formatting (e.g., font type, zoom level, and color). A visual layout tree defines the layout of a document within one or more display areas. For example, a visual layout tree may specify that an image of a chapter is to be positioned at a specific location (e.g., coordinates (10,20)) within a display area. Visual layout nodes of a visual layout tree represent the layout of the content of a document hierarchically. For example, a visual layout tree may include a container visual layout node representing a display area that contains one or more paragraphs of a chapter. The container visual layout node may have a child visual layout node for each paragraph that it contains and have positioning information indicating where the text of each paragraph is to be positioned in the display area of the container. The layout engine receives as input a visual description tree and generates the corresponding visual layout tree. A rendering engine then inputs the visual layout tree and generates a graphics buffer containing the pixels representing the layout of the document as defined by the visual layout tree.

In some embodiments, the layout engine generates a visual layout tree for a visual description tree whose content is to be displayed in multiple display areas, referred to as being fragmented. For example, an application may specify to the layout engine that a document is to be displayed in two side-by-side display areas. The layout engine inputs the visual description tree and an indication of the display areas and generates a visual layout tree with a subtree for each display area. If content associated with a visual description node is to be displayed in separate display areas, the layout engine traverses the visual description tree for each display area and records where in the traversal (e.g., a path down the visual description tree) the processing for the current display area ended along with state information describing the state at the time the processing ended, referred to as a layout interruption record. The layout engine then uses that layout interruption record for one display area to indicate the starting point within the visual description tree that the layout for the next display area should begin. Initially, the layout engine may set a layout interruption record to indicate a beginning path of visual description nodes that is the beginning of the document. For each display area that is to contain content of the document, the layout engine processes the visual description tree for visual description nodes starting with visual description nodes along the path of the layout interruption record, sets a current state for processing the visual description node based on a state indicated by the layout interruption record for that visual description node. The layout engine then populates the visual layout tree with one or more visual layout nodes representing content of the visual description node to be included in the display area given the current state. When processing of the content of the visual description node is interrupted for the display area, the layout engine adds to a layout interruption record for the next display area the then-current state of processing of the visual description node and an identifier of the visual description node. A path within the visual description tree is thus formed in the layout interruption record for the next display area of where the processing of the visual description tree was interrupted for the display area. The path defines where the processing for the next display area is to start.

In some embodiments, the layout engine generates a visual layout tree for a visual description tree of a document based on cached information. The layout engine generates a first visual layout tree based on a first visual layout context by creating visual layout nodes of the first visual layout tree representing the document. The layout engine generates a visual layout node generated based on a node context the may include the size of area (e.g., a layout restriction) in which the content of the visual layout node is to be laid out. The layout engine caches the created visual layout nodes along with their node contexts. The layout engine may then generate a second visual layout tree based on a second visual layout context (e.g., portrait versus landscape). The layout engine generates visual layout nodes of the second visual layout tree by, when the node context for a visual layout node of the second visual layout matches the node context of a cached visual layout node, reusing the cached visual layout node for the second visual layout tree. When the node context for a visual layout node of the second visual layout does not match the node context of a cached visual layout node, the layout engine creates a visual layout node for the second visual layout tree for the new node context. In some embodiment, the cached information may also include a layout interruption record so that visual layout nodes are reused only when generated in the context of compatible layout interruption records.

In some embodiments, the layout engine generates a visual layout tree for a document that uses positioning pointers (e.g., visual layout handles). The layout engine creates visual layout nodes of the visual layout tree. For each visual layout node, the layout engine generates a positioning pointer for the visual layout node that links the visual layout nodes to form the visual layout tree. Each positioning pointer has a pointer to a child visual layout node and positioning information for positioning the child visual layout node within the context (e.g., coordinate space) of a parent visual layout node so that the position of the child visual layout node within the context of the parent visual layout node can be changed without having to recreate the visual layout node.

In some embodiments, the layout engine detects a change in positioning information of a visual layout node of a visual layout tree and may use that change to animate the movement of content of the visual layout node from the start location in a display area to the destination location in the display area. The layout engine stores the visual layout tree with visual layout nodes and visual layout handles that specify parent/child relationship between visual layout nodes. A visual layout handle has a reference to a child visual layout node and to its parent visual layout node along with positioning information indicating position of the child visual layout node within the coordinate space of its parent visual layout node. Each child visual layout node has a back reference to the visual layout handle that references it. The layout engine generates a modified visual layout tree in which a moved child visual layout node has been moved from a start location within the coordinate space of its parent visual layout node to a destination location within the coordinate space of its parent visual layout node. The layout engine generates a new visual layout handle that has a reference to the moved child visual layout node and the same parent visual layout node along with new positioning information specifying the destination location. Upon detecting that the back reference of the moved child visual layout node references a visual layout handle different from the newly generated visual layout handle, the layout engine indicates that the moved visual layout node has been moved. Since both visual layout handles have a reference to the same parent visual layout node, the layout engine can detect that the start location and the destination location are within the coordinate space of the same parent visual layout node.

In some embodiments, the layout engine animates the movement of the content by initializing a storyboard to generate a path of coordinates from the start location to the destination location and setting the new visual layout handle to indicate animation is in progress. When the rendering engine requests positioning information for the new visual layout handle, the rendering engine accesses the storyboard to retrieve coordinates for a point along a path from the start location to the destination location. Thus, as the rendering engine successively generates frames to be displayed, different positioning information for the visual layout node is generated so that the rendering engine can render the content at successively different locations within a graphics buffer.

In some embodiments, the layout engine generates a visual layout tree that is virtualized for use in rendering content of a document. The layout engine receives an anchor point within the document. The anchor point identifies a visual description node within the visual description tree and a named point within content of the identified visual description node. A named point may be, for example, on a rectangle of the measured size (e.g., bounding rectangle of the content), such as the lower right corner of the measured size. A name point may also be specific to the type of content. For example, content representing the face of a clock may have a named point for each of the 12 hours. The layout engine also receives a target location within a display area in which content associated with the anchor point is to be positioned. A person reading the document using an e-reader application may select a figure of a clock from an index of figure, and the e-reader application may direct the layout engine to generate a visual layout tree for rendering a portion of the document on a display area with the 10 o'clock named point at a certain position in the display area. The layout engine traverses the visual description tree along a path from the root of the visual description tree to the identified visual description node. While traversing the layout engine generates visual layout nodes for the visual description nodes along the path and a visual layout node for the identified visual description node, which represents content of the identified visual description node. The layout engine then generates positioning information for the visual layout nodes along the path from the root visual layout node to the visual layout node generated for the identified visual description node so that the name point of the content is positioned at the target location in the display area. When the content of the identified visual description node does not fill the display area, the layout engine generates visual layout nodes for visual description nodes adjacent to the identified visual description node to fill the display area with content without having to generate visual layout nodes for the entire document.

In some embodiments, the content of a document may be represented as a three-dimensional object. For example, if the document contains a triangular prism, then the visual description tree for the document may include a visual description node specifying a triangular prism. The positioning information for the visual layout node may specify a three-dimensional rotation of the triangular prism as a pitch, roll, and yaw and three-dimensional translation of the triangular prism. When the rendering engine renders the triangular prism, it applies the specified rotation and generates a projection onto a two-dimensional surface. If the document includes text to be rendered on three of the sides of the triangular prism, then the visual description tree may include visual description nodes for three paragraphs representing text for the sides. When generating the visual layout tree, the layout engine generates a visual layout node for the triangular prism and visual layout nodes indicating that three paragraphs are to be applied as two-dimensional textures to the sides of the triangular prism. The triangular prism may be represented in the visual description tree with a visual description node for the triangular prism with a child visual description node for each of the three sides and two ends. The visual description nodes corresponding to each of the three sides have a child visual description node representing the paragraph that is to appear on the side. The rendering engine renders the triangular prism with the corresponding textures based on the visible sides of the prism in accordance with the pitch, roll, and yaw. In some embodiments, the content of a document may specify the three-dimensional rotation of a two-dimensional object. For example, a paragraph containing text may have positioning information indicating a pitch of 45 degrees (i.e., rotation around the x-axis). In such a case, the rendering engine renders the text of the paragraph as if placed on a surface at an angle of 45 degrees to the display area.

In some embodiments, a visual layout tree may be used to support three-dimensional hit testing to identify content corresponding to a specified location on a display. For example, when editing a document that contains a triangular prism with text on the sides of the prism, a user may point to a location on the display within a bounding rectangle of a character of the text. The corresponding face of the triangular prism that contains the selected character and the position of the pointed to location within the face (or text of the face) can be determined from the positioning information including rotation of the prism.

FIG. 1 illustrates the display of an example document within a display area that is large enough to display the entire content of the example document. The example document contains paragraphs 1, 2, and 3. Paragraph 1 contains text 1.1, image 1.2, and text 1.3; paragraph 2 contains text 2.1 and image 2.2; and paragraph 3 contains text 3.1. The display device 100 includes a display area 110, which may correspond to the entire displayable area of the display device (e.g., smart phone screen) or a portion of the display device (e.g., window for displaying the example document). Because of the size of the display area 110, paragraphs 1, 2, and 3 (i.e., the entire document) are displayed at the same time.

Figure 2:
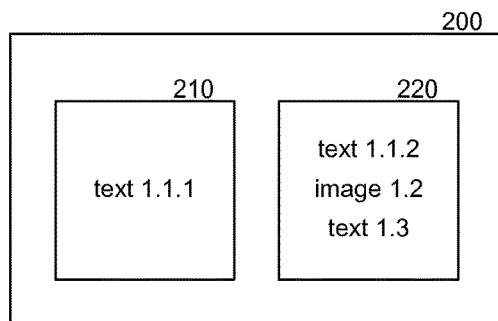
FIG. 2 illustrates the display of the example document within display areas that are not large enough to display the entire content of the example document.

FIG. 2 illustrates the display of the example document within display areas that are not large enough to display the entire content of the example document. The display device 200 includes display areas 210 and 220. The display areas may correspond to a scrollable page view for the example document where the pages scroll horizontally. A first portion of the example document is displayed in display area 210, a second portion is displayed in display area 220, and a third portion is not displayed. Since paragraph 1 cannot fit into display area 210, a first portion of paragraph 1 is displayed in display area 210, and a remaining second portion of paragraph 1 is displayed in display area 220. Since text 1.1 cannot fit into display area 210, a first portion of text 1.1, referred to as text 1.1.1, is displayed in display area 210. A remaining second portion of text 1.1, referred to as text 1.1.2, is displayed in display area 220 along with the remainder of paragraph 1. Although display areas 210 and 220 are illustrated as being displayed simultaneously on the display device 220, a display area may represent the entire area of a small display device on which only a portion of the example document can be displayed at a time (e.g., a scrollable view with only one display area).

Figure 3:
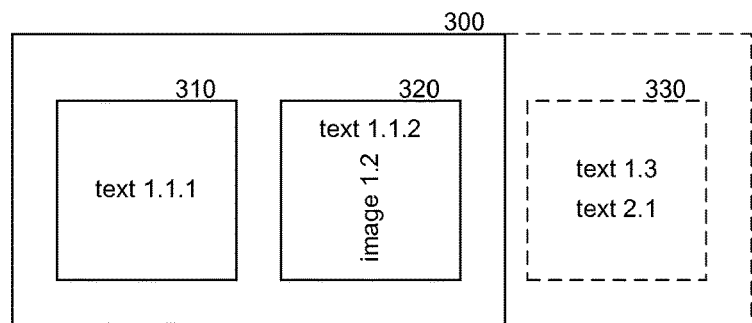
FIG. 3 illustrates a display of a modified example document within display areas that are not large enough to display the entire content of the example document.

FIG. 3 illustrates a display of a modified example document within display areas that are not large enough to display the entire content of the example document. The example document has been modified so that image 1.2 is rotated 90 degrees. The display device 300 includes display areas 310 and 320. The display area 310 displays content that is identical to the content of display area 210. The display area 320 displays text 1.1.2 and the rotated image 1.2. Because image 1.2 has been rotated, text 1.3 can no longer fit into the same display area as text 1.1.2 and image 1.2. If the display device also included display area 330, then text 1.3 would be laid out as part of display area 330, as indicated by the dashed lines.

Figure 4:
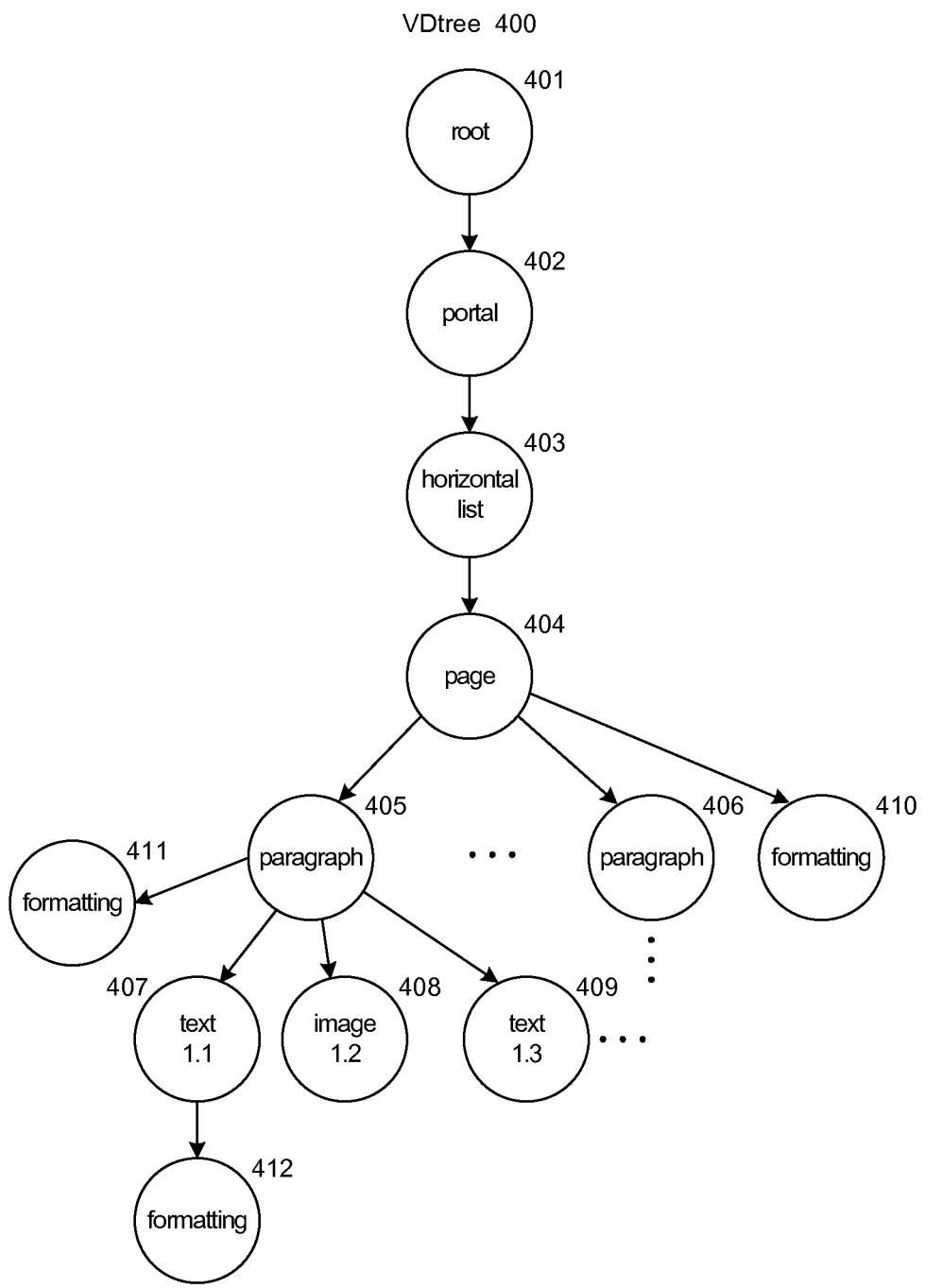
FIG. 4 illustrates the organization of the example document in some embodiments.

FIG. 4 illustrates the organization of the example document in some embodiments. The documents that are input by the layout engine are stored as a tree data structure, referred to as a visual description tree or VDtree, that contains the content and formatting of the document. The VDtree 400 includes nodes 401-412, referred to as VDnodes to indicate that they are nodes of a VDtree. Each VDnode has an associated type of either a document organizational unit or formatting associated with an organizational unit. The types of organizational units may include portal, horizontal list, vertical list, chapter, index, paragraph, text, image, graph, map, footnotes, and so on. The formatting type indicates that the VDnode contains formatting information for its parent organizational unit. VDnode 401 is of type root and represents the entire document. VDnode 402 is of type portal and represents that its child nodes are to be laid out in a single portal. VDnode 403 is of type horizontal list of its child nodes. VDnode 404 is of type page and represents that its child nodes (i.e., that are non-formatting nodes) are to be laid out as pages. VDnodes 405 and 406 are of type paragraph and represent that their child nodes are to be laid out as separate paragraphs. VDnode 405 corresponds to paragraph 1 of the example document. VDnodes 407 and 409 are of type text and represent text of the paragraph represented by VDnode 405. If the text of a paragraph has different formatting characteristics (e.g., highlighting), then the VDnode for the paragraph may have a child VDnode for each span of text with the same formatting. VDnode 408 is of type image and represents an image within the paragraph represented by VDnode 405. VDnodes 407, 408, and 409 may represent the text by containing the text, a reference to the text, or some other mapping to the corresponding text. VDnodes 410, 411, and 412 are of type formatting and represent formatting that applies to their parent nodes. For example, VDnode 410 may indicate that each page is to have a certain type of border or margin width. VDnode 411 may indicate indentation of the first line, line spacing, font type, and so on for the paragraph represented by VDnode 405. VDnode 412 may indicate font type for the text represented by VDnode 407, which may override the font type indicated by VDnode 411.

The layout engine inputs a VDtree and generates a visual layout tree, referred to as a VLtree, that contains content of the document with layout information for displaying the content within the display areas. A rendering engine then inputs the VLtree and renders the content of the VLtree in accordance with the layout information of the VLtree. A VDtree conceptually describes how a document should be layout in general. A VLtree, in contrast, describes the actual layout of the content to a specific display area. The VLtree includes visual layout nodes, referred to as VLnodes to indicate that they are nodes of a VLtree. The VLnodes specifies the coordinates of where content is to be located. A parent VLnode has a coordinate space (e.g., 1024 by 1024) and specifies where the content of each child VLnode is to be positioned in that coordinates space. Each child VLnode also has its own coordinate space (e.g., 256 by 256), which in turn specified the content of each of its child VLnodes is to be position. The layout engine performs mappings between the coordinate spaces.

Figure 5:
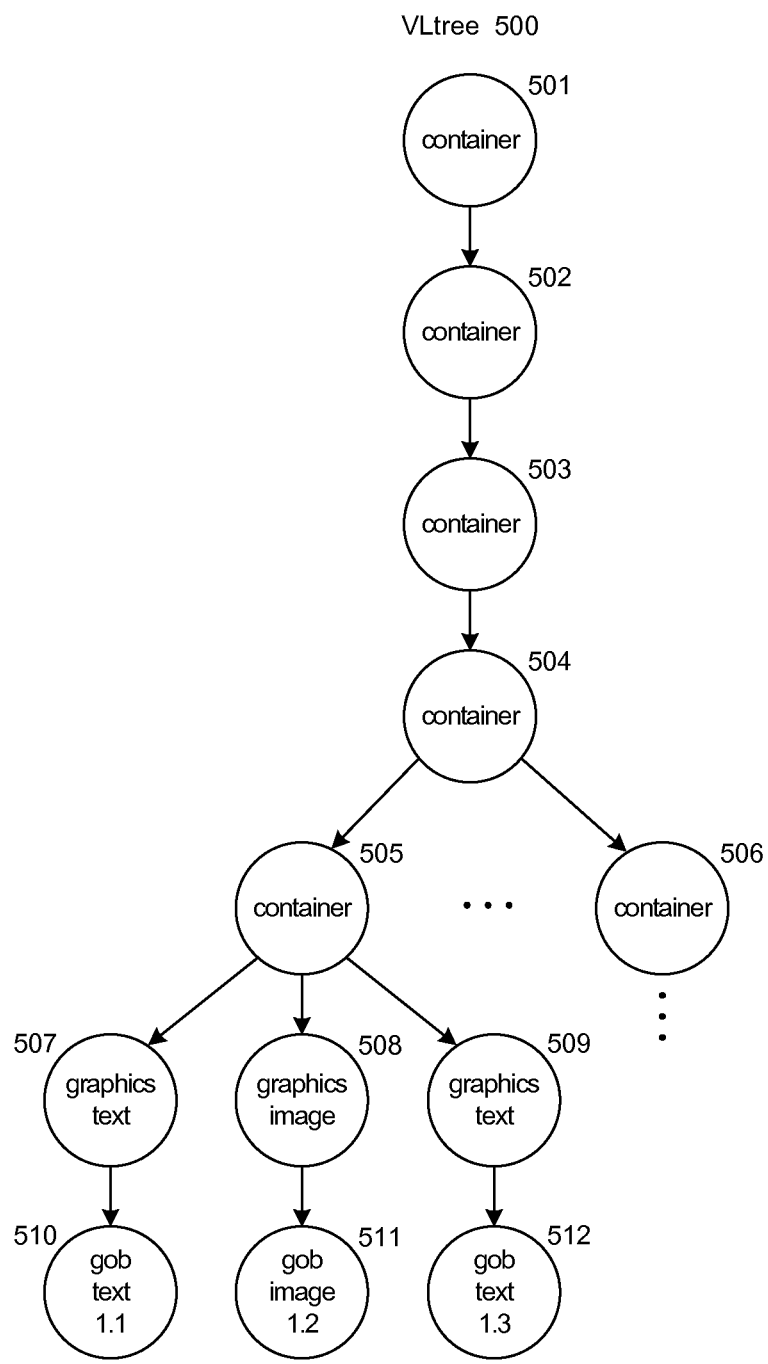
FIG. 5 illustrates an example tree corresponding to the example document in some embodiments.

FIG. 5 illustrates an example tree corresponding to the example document in some embodiments. The layout engine generates VLtree 500 for rendering in the display area 110 the example document as represented by VDtree 400. The VLtree 500 contains VLnodes may be of type container, graphics, graphical object ("gob"), and so on. A VLnode of type container represents a grouping of child VLnodes, a VLnode of type graphics represents a type of content (e.g., text or image), and a VLnode of type graphical object represents the content for its parent VLnode. VLnodes 501-506 are container nodes corresponding to VDnodes 401-406. VLnodes 507 and 510 correspond to VDnode 407, VLnodes 508 and 511 correspond to VDnode 408, and VLnodes 509 and 512 correspond to VDnode 408. VLnodes 507-509 are graphics nodes for text or image content. VLnodes 510-512 represent content of the document. Since VLnode 505 corresponds to the paragraph VDnode 405, VLnodes 510-512 represent the content of that paragraph (i.e., paragraph 1). In some embodiments, the VLnodes 507-509 may be merged with their child VLnodes. In such a case, the VLnodes 507-509 may contain the content or a reference to the content.

The directed links between the VLnodes of a VLtree are represented by objects referred to as visual layout handles. A visual layout handle contains a reference to a child VLnode along with some formatting information such as positioning information and color information for that child VLnode. FIG. 14B illustrates organization of a visual layout handle. The positioning information may include the x, y, and z coordinates for placing the content represented by the VLnode within the coordinate space of the parent VLnode. The positioning information may also include orientation information (e.g., rotate 90 degrees) on how to orient the content, scaling information (e.g., 150%) on how to scale the content within the coordinate space of the parent VLnode, and z-order related information. For example, the visual layout handle pointing from VLnode 504 to VLnode 505 may indicate that paragraph 1 is to be positioned at coordinates (120, 10) within the coordinate space of VLnode 504 and rotated zero degrees.

Figure 6:
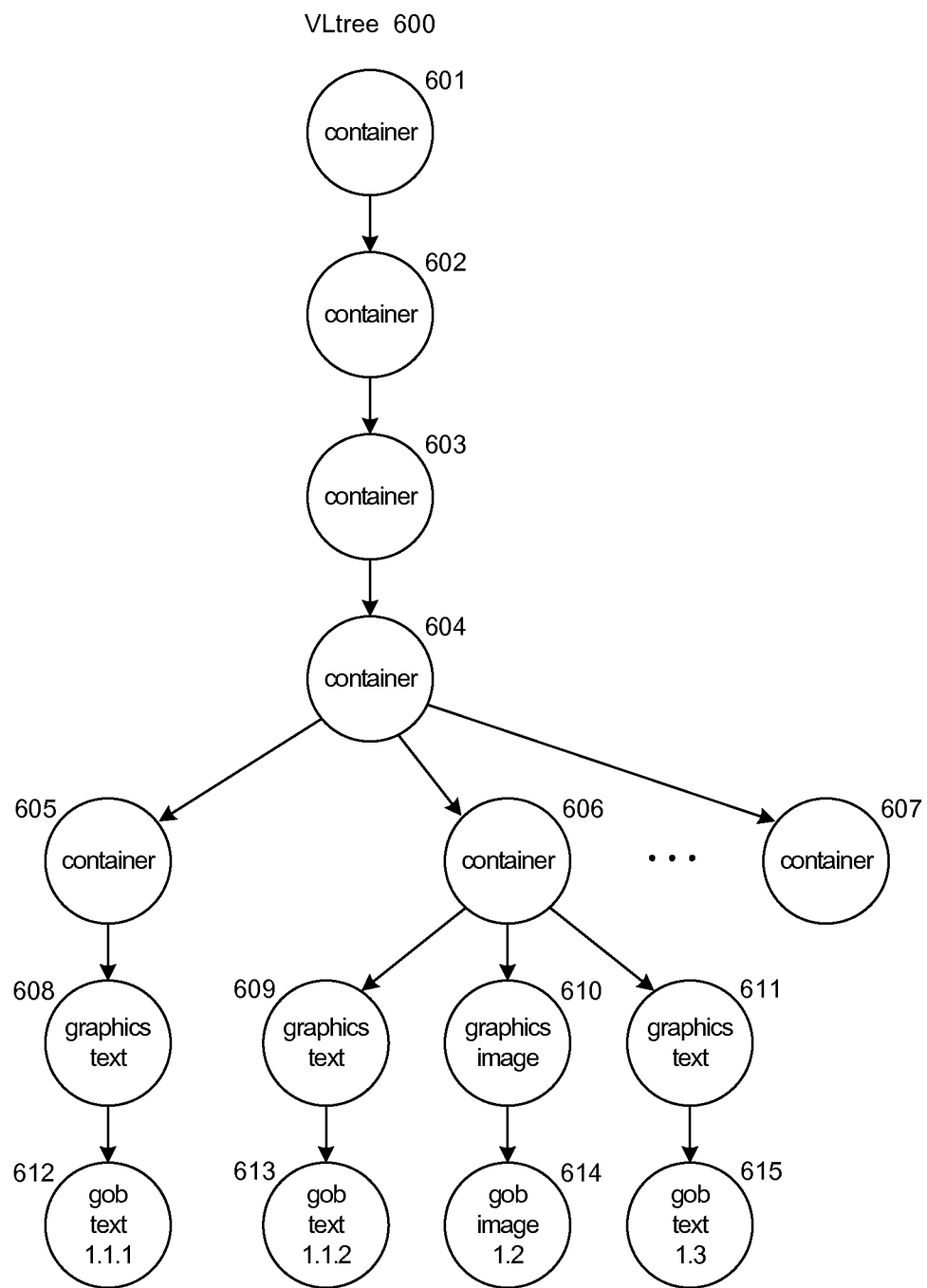
FIG. 6 illustrates a visual layout tree for the display areas of FIG. 2.

When a document is to be rendered in multiple display areas, the layout engine may generate a VLtree with a subtree for each display area that contains the VLnodes for rendering a portion of the document in that display area. FIG. 6 illustrates a visual layout tree for the display areas of FIG. 2. The VLtree 600 includes VLnodes 601-604 corresponding to VLnodes 501-504. VLnode 605 is the root node of a subtree corresponding to the content of display area 210, and VLnode 606 is the root node of a subtree corresponding to the content of display area 220. Since paragraph 1 does not fit into display area 210, the content for VLnode 605 includes only the content of text 1.1.1, and the content for VLnode 606 includes the remaining portions of paragraph 1.

Figure 7:
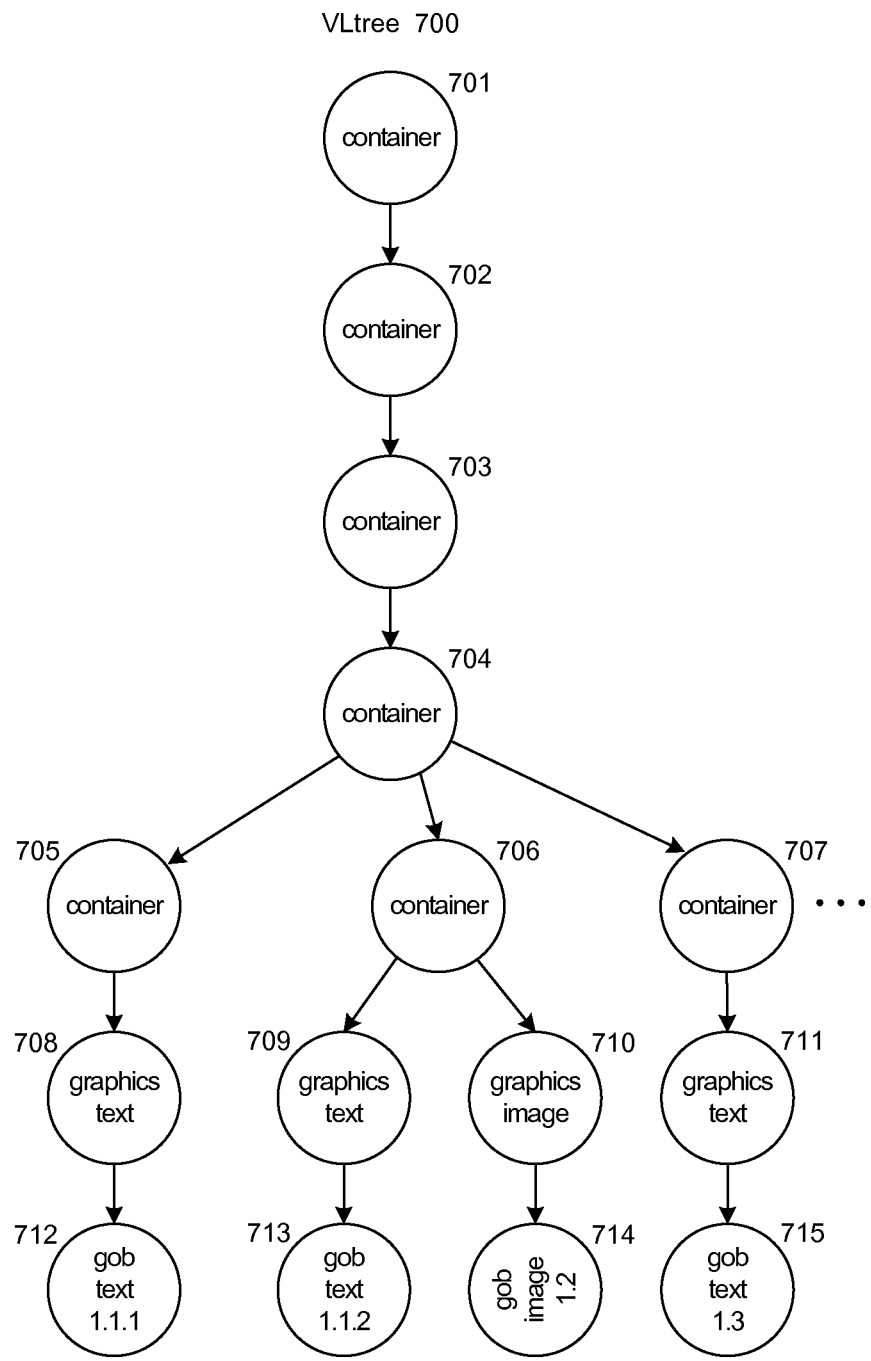
FIG. 7 illustrates a visual layout tree for the display areas of FIG. 3.

FIG. 7 illustrates a visual layout tree for the display areas of FIG. 3. In this example, image 1.2 is rotated 90 degrees. The VLtree 700 includes VLnodes 701-704 corresponding to VLnodes 501-504. VLnode 705 is the root node of a subtree corresponding to the content of display area 310, VLnode 706 is the root node of a subtree corresponding to the content of display area 320, and VLnode 707 is the root node of a subtree corresponding to the content of display area 330, which is not displayed in FIG. 3. VLnodes 710 and 714 may have content that is identical to that of VLnodes 610 and 614 with the rotation of 90 degrees being represented by the visual layout handle from VLnode 706 to VLnode 710. When the rendering engine processes VLnode 710, it rotates the content as indicated by the visual layout handle.

Figure 8:
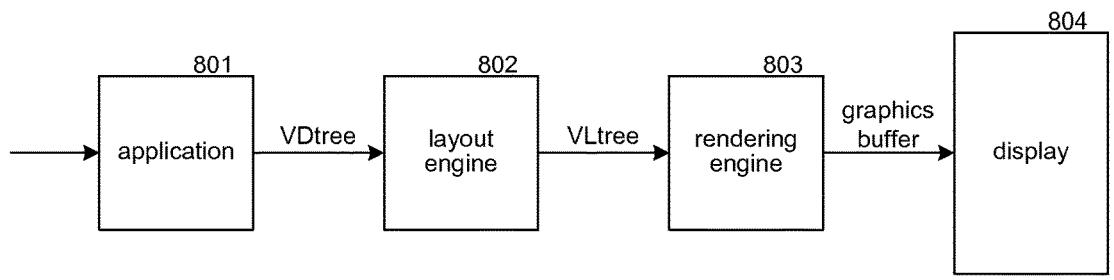
FIG. 8 is a block diagram that illustrates the flow of content in some embodiments.

FIG. 8 is a block diagram that illustrates the flow of content in some embodiments. The application 801 generates a VDtree representing the content to be rendered. The layout engine 802 inputs the VDtree and generates the corresponding VLtree. For each VDnode, the layout engine instantiates a visual layout object of the type of the VDnode. For example, the layout engine would instantiate visual layout object of type paragraph for a VDnode representing a paragraph. The layout engine then invokes the layout component of the visual layout objects to generate the corresponding VLnodes. When a new type of VDnode is defined or the behavior of an existing layout object is changed, a new visual layout object that implements the desired behavior can be provide to the layout engine. The layout engine may recursively invoke the layout components of the visual layout objects in a traversal of a VDtree. The layout engine initially invokes the layout component of a visual layout object for the root VDnode of the VDtree. That layout component then requests the layout engine to invoke layout components of visual layout objects for the child VDnodes of the root VDnode. When invoking a layout component on behalf of a parent VDnode, the layout engine provides a rectangle corresponding to the size of the area within a display area. The layout component generates the corresponding VLnodes and returns to the layout engine the amount of the rectangle that it used to layout its content. The layout engine returns size of the remaining rectangle to the layout component for the parent VDnode so that that layout component can determine whether to invoke layout components corresponding to other child VDnodes or to return that size to the layout component of its parent VDnode. The rendering engine 803 inputs the VLtree and renders the corresponding content to a graphics buffer for output to display 804.

Figure 9:
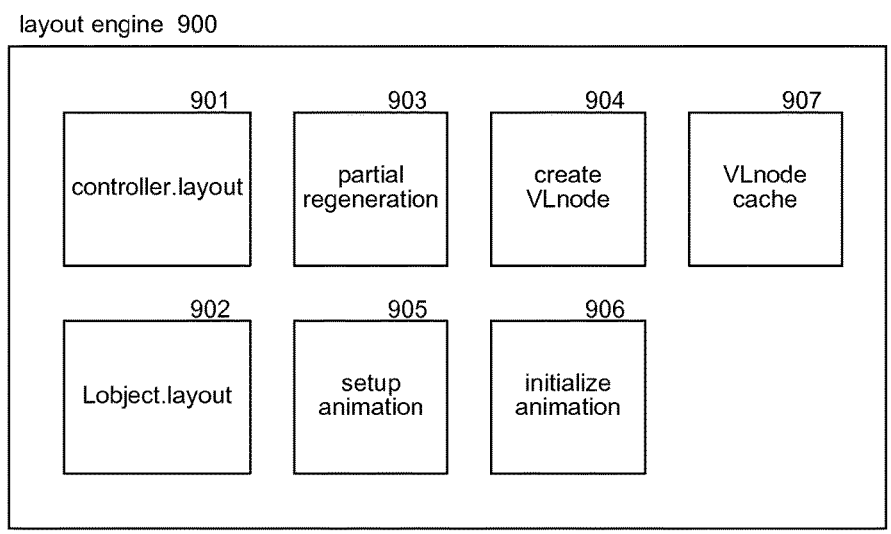
FIG. 9 is a block diagram that illustrates components of the layout engine in some embodiments.

FIG. 9 is a block diagram that illustrates components of the layout engine in some embodiments. The layout engine 900 includes a controller layout component 901, Lobject layout components 902, a partial regeneration component 903, a create VLnode component 904, a setup animation component 905, an initialize animation component 906, and a VLnode cache 907. The controller layout component is invoked to generate a VLtree for a VDtree. Each Lobject layout component is invoked to generate the VLnodes corresponding to a VLnode. The partial regeneration component is invoked to regenerate a portion of a VLtree based on annotations on the VDnodes indicating which VDnodes have been modified. The create VLnode component creates a VLnode or returns a reference to a cached VLnode. The setup animation component and the initialize animation component control the animation of the rendering of a VLtree.

The computing devices and systems on which the layout engine may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touchscreens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that includes computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the layout engine. The data transmission media is used for transmitting data via transitory, propagating signals or carrier waves (e.g., electromagnetism) via a wired or wireless connection.

The layout engine may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the layout engine may be implemented in hardware using, for example, an application-specific integrated circuit ("ASIC").

Figure 10:
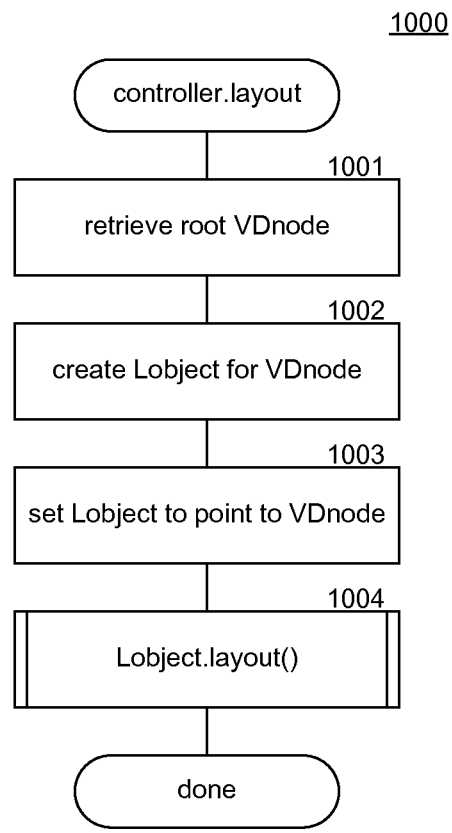
FIG. 10 is a flow diagram that illustrates the processing of a layout component of the controller of the layout engine in some embodiments.

FIG. 10 is a flow diagram that illustrates the processing of a layout component of the controller of the layout engine in some embodiments. The layout component 1000 is invoked when the VLtree for a VDtree is to be generated. For example, an application that modifies a document and thus the VDtree may invoke the component to regenerate the VLtree for rendering the modified document. The layout component has access to the VDtree for the document and a display area. In this illustrated processing, the component assumes that the display area is large enough to contain the entire document. In block 1001, the component retrieves the root VDnode. In block 1002, the component creates a Lobject for the root VDnode. The Lobjects implement the behavior for generating the VLnodes for a certain type of VDnode. For example, a Lobject for a paragraph implements behavior specific to a paragraph. In block 1003, the component sets the Lobject to point to the root VDnode. Each Lobject will eventually point to its corresponding VDnode and VLnode. In block 1004, the component invokes the layout component of the created Lobject and completes.

Figure 11:
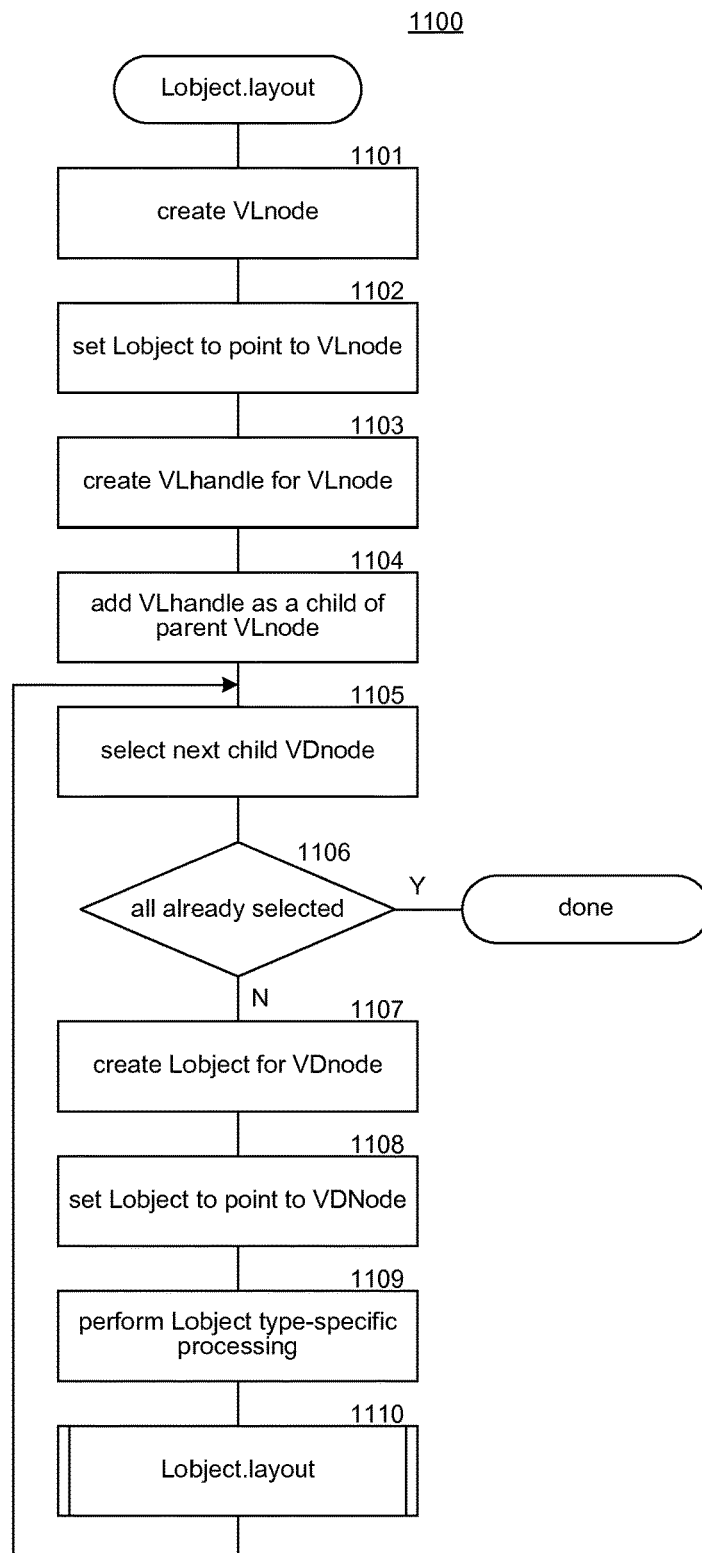
FIG. 11 is a flow diagram that illustrates the processing of the layout component for a typical layout object in some embodiments.

FIG. 11 is a flow diagram that illustrates the processing of the layout component for a typical layout object in some embodiments. The component 1100 generates VLnodes for the subtree corresponding to the VDnode of this Lobject. In blocks 1101-1104, the component creates a VLnode and links the VLnode into the VLtree. In block 1101, the component creates a VLnode specific to the VDnode of this Lobject. For example, if the VDnode is of type text, then the component creates a graphics VLnode that represents text. In block 1102, the component sets this layout object to reference the VLnode so that this layout object references both the VDnode and its corresponding VLnode. In block 1103, the component creates a visual layout handle for the VLnode. In block 1104, the component adds the visual layout handle to the parent VLnode except when that VLnode is the root of the VLtree. In blocks 1105-1110, the component loops processing each child of the VDnode of this Lobject. In block 1105, the component selects the next child VDnode. In decision block 1106, if all the child VDnodes have already been selected, then the component completes, else the component continues at block 1107. In block 1107, the component creates a Lobject of the type of the child VDnode. In block 1108, the component sets the created Lobject to point to the selected VDnode. In block 1109, the component performs type-specific processing for the Lobject. For example, if the Lobject represents a text VDnode, then the component may generate the glyphs for the text, add a VLnode of type graphical object, and add to the VLnode a reference to the glyphs. When generating the glyphs, the component factors in formatting information of the VDnode and its ancestor VDnodes. The component may invoke standard functions of an operating system to generate the glyphs. In block 1110, the component invokes the layout component of the newly created Lobject to generate the portion of the VLtree corresponding to the selected child VDnode and then loops to block 1106 to select the next child VDnode. Although the layout component is illustrated as directly invoking the layout components of its child Lobjects, the layout component may instead request the layout engine to invoke the layout components of its child Lobjects on its behalf. Such a request allows the layout engine to take control and provider overall control of the layout process and perform processing that would otherwise need to be performed by each type of Lobject. For example, the layout engine may update the positioning information in the visual layout handles.

Figure 12:
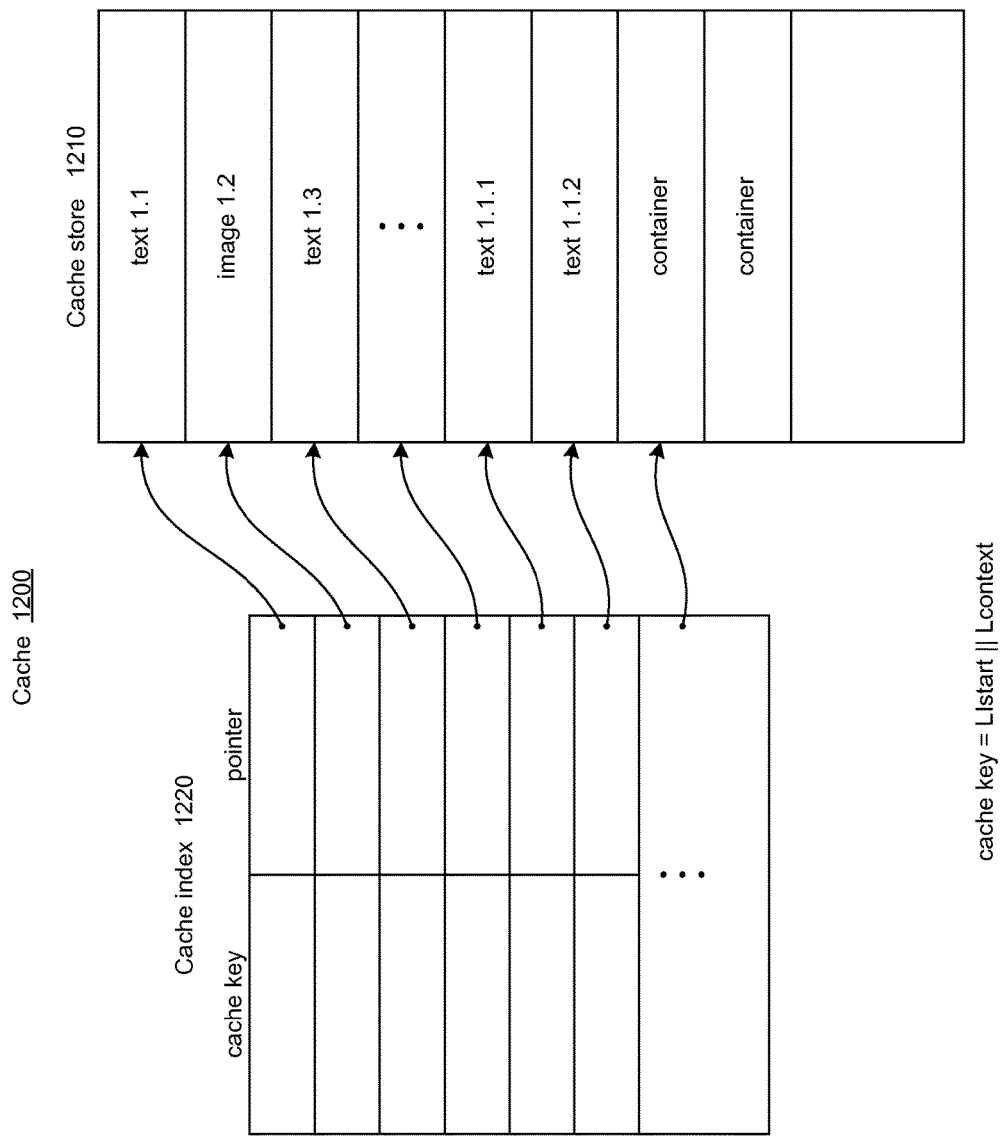
FIG. 12 illustrates a visual layout node cache in some embodiments. A cache 1200 includes a cache store 1210 and a cache index 1220.

FIG. 12 illustrates a visual layout node cache in some embodiments. A cache 1200 includes a cache store 1210 and a cache index 1220. The cache store contains entries corresponding to VLnodes that have been created. When the VLtree is regenerated (e.g., when a display is rotated from portrait view to landscape view), portions of the newly generated VLtree may be the same as a prior VLtree. In such a case, the layout engine can reuse those VLnodes of the cache without having to regenerate them. The layout engine creates the VLnode within the cache store. The layout engine creates a VLnode based on a current state of the layout process when the layout component that creates the VLnode is invoked. For example, the current state may be a combination of information identifying the corresponding VDnode, a demand rectangle, layout context (e.g., formatting information), a layout interruption record, and so on. The layout engine assigns a cache key to each cached VLnode that identifies the current state at the time the VLnode was created. When the VLtree is regenerated, the cache can be searched for a VLnode with the same state. If such a VLnode is found, it can be reused. Otherwise, the layout engine generates a new VLnode in the cache. To facilitate searching for a VLnode with a matching cache key, the layout engine stores the cache keys in a cache index that maps the cache keys to their corresponding VLnodes in the cache store (or cache storage). The cache index may be organized using a variety of data structures such as a hash table, tree data structure, and so on.

Figure 13:
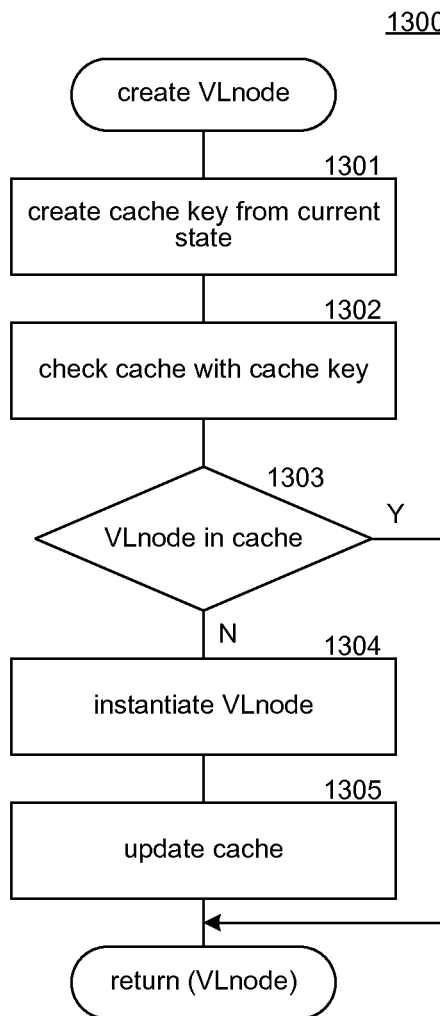
FIG. 13 is a flow diagram that illustrates the processing of a create visual layout node component in some embodiments.

FIG. 13 is a flow diagram that illustrates the processing of a create visual layout node component in some embodiments. The component 1300 checks the cache to see whether a VLnode already has been created for the same state. If so, the component reuses the VLnode, else the component creates a VLnode in the cache. In block 1301, the component creates a cache key based on the current state of the layout processing. In block 1302, the component checks the cache for a matching cache key. In decision block 1303, if a matching cache key is found, the component returns the corresponding pointer to the VLnode in the cache, else the component continues at block 1304. In block 1304, the component creates a VLnode in the cache. In block 1305, the component updates the cache index to map the cache key to the pointer to the newly created VLnode object and then returns the pointer.

Layout Interruption

Figure 14A:
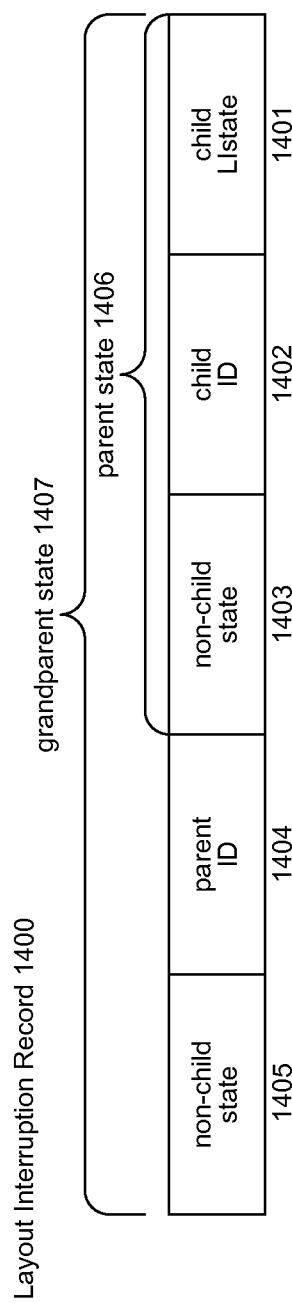
FIG. 14A is a block diagram illustrating the layout of a layout interruption record in some embodiments.
Figure 14B:
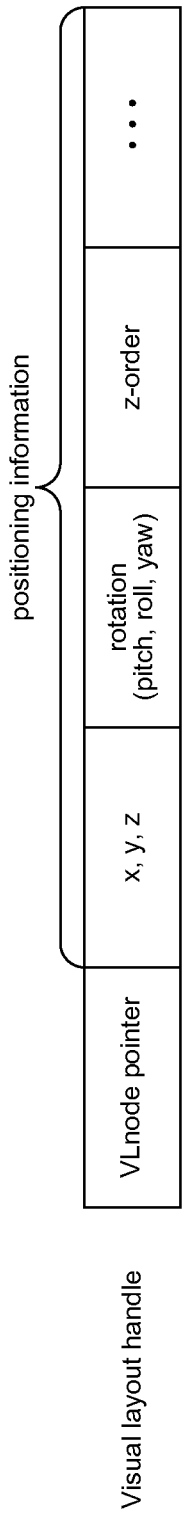
FIG. 14B illustrates organization of a layout handle.

FIG. 14A is a block diagram illustrating the layout of a layout interruption record in some embodiments. The layout interruption record 1400 contains the current state of a path in the VDtree that cannot completely fit within the current display area. Each Lobject returns a layout stop record indicating what portion of its VDnode was laid out. The layout stop record may indicate "end" when the VDnode has been completely laid out or may be a layout interruption record that indicates the current state at the time the layout stopped. When a parent Lobject receives a stop layout interruption record indicating that a child VDnode has not been completely laid out, the parent Lobject adds an identifier of that child VDnode and its own current state to the stop layout interruption record and returns the layout stop record to its parent Lobject. The layout interruption record includes child state 1401, child identifier 1402, non-child state 1403, parent identifier 1404, and non-child state 1405. The child state 1401 was returned to a parent Lobject, which added the child identifier 1402 and the current state, non-child state 1403, of the parent Lobject. The parent state 1406 was returned to the grandparent Lobject, which added the parent identifier 1404 and the current state, non-child state 1405, of the grandparent. The grandparent state 1407 was then returned to the great-grandparent Lobject and so on until the Lobject corresponding to the root node was encountered. In some embodiments, upon receiving an indication that the layout of a child VDnode has not been completed, a parent Lobject may continue to process its other child VDnodes. In such a case, each child Lobject may return its own current state, and the parent Lobject generates a layout interruption record that includes the child identifier and state of each child Lobject whose layout was not completed.

When a Lobject is invoked, its parent Lobject passes a layout start record indicating where in the corresponding VDnode the layout should start. Typically, the layout start record would indicate the beginning of the VDnode. If the layout start record is a layout interruption record, the invoked Lobject sets its state to that of the layout interruption record and continues to lay out the VDnode where it last left off.

Figure 15:
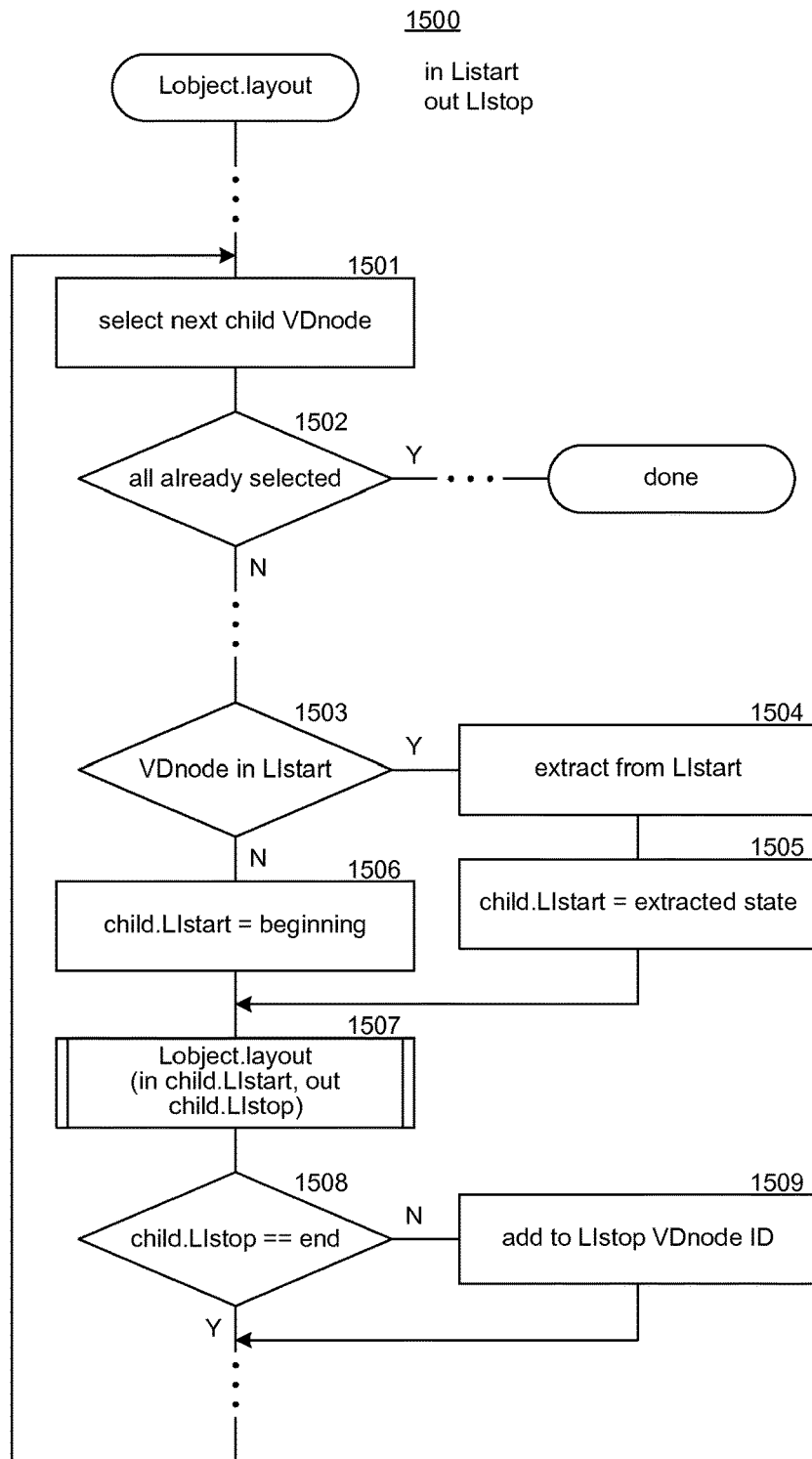
FIG. 15 is a flow diagram that illustrates the processing of a layout component of a layout object to handle a layout interruption in some embodiments.

FIG. 15 is a flow diagram that illustrates the processing of a layout component of a layout object to handle a layout interruption in some embodiments. The flow diagram illustrates the processing of the layout component just for handling a layout start record, which in this example is a layout interruption record. The 1500 component is passed a layout interruption record and returns a layout stop record, which is a layout interruption record if the layout was interrupted. In blocks 1501-1509, the component loops selecting each child VDnode. In block 1501, the component selects the next child VDnode. In decision block 1502, if all the child VDnodes have already been selected, then the component completes, else the component continues at block 1503. In decision block 1503, if the identifier of the VDnode is in the layout start record, the component continues at block 1504, else the component continues at block 1506. In block 1504, the component extracts the state for the VDnode from the layout start record. In block 1505, the component sets the layout start record for the child VDnode to the extracted state. In block 1506, the component sets the layout start record for the child VDnode to indicate to start at the beginning. In block 1507, the component invokes the layout component of the child VDnode passing the layout start record for the child VDnode. In decision block 1508, if the invoked layout component returns a layout stop record indicating that the layout stopped at the end of the child VDnode, then the component loops to block 1501 to select the next child VDnode, else the component continues at block 1509. In block 1509, the component adds to the layout stop record the identifier of the child VDnode and optionally any state information that the component may need to resume layout of the child VDnode. The component then loops to block 1501 to select the next child VDnode.

Animation

In some embodiments, the layout engine provides for automatic animation in the rendering of movement from a first version of a document to a second version of the document. For example, a chess game application may generate different versions of the document corresponding to the current position of the chess pieces on a chessboard. When a player indicates to move a chess piece from one location to another, the layout engine allows that movement to be automatically animated to show the gradual movement of that chess piece to the other location rather than simply having the chess piece abruptly show up at the other location. When the application generates the second version of the document, the layout engine detects the changed location of the chess piece, initializes a storyboard for generating a path from the current location to the destination location, and generates a visual layout handle for the chess piece that references the storyboard. During rendering, when that visual layout handle is accessed by the rendering engine to render the next frame, the visual layout handle provides positioning information based on the current state of the storyboard, that is, a position along the path from the current location to the destination location. In this way, the layout engine can provide animation without the application having to regenerate the visual layout tree for each frame of the animation.

Figure 16:
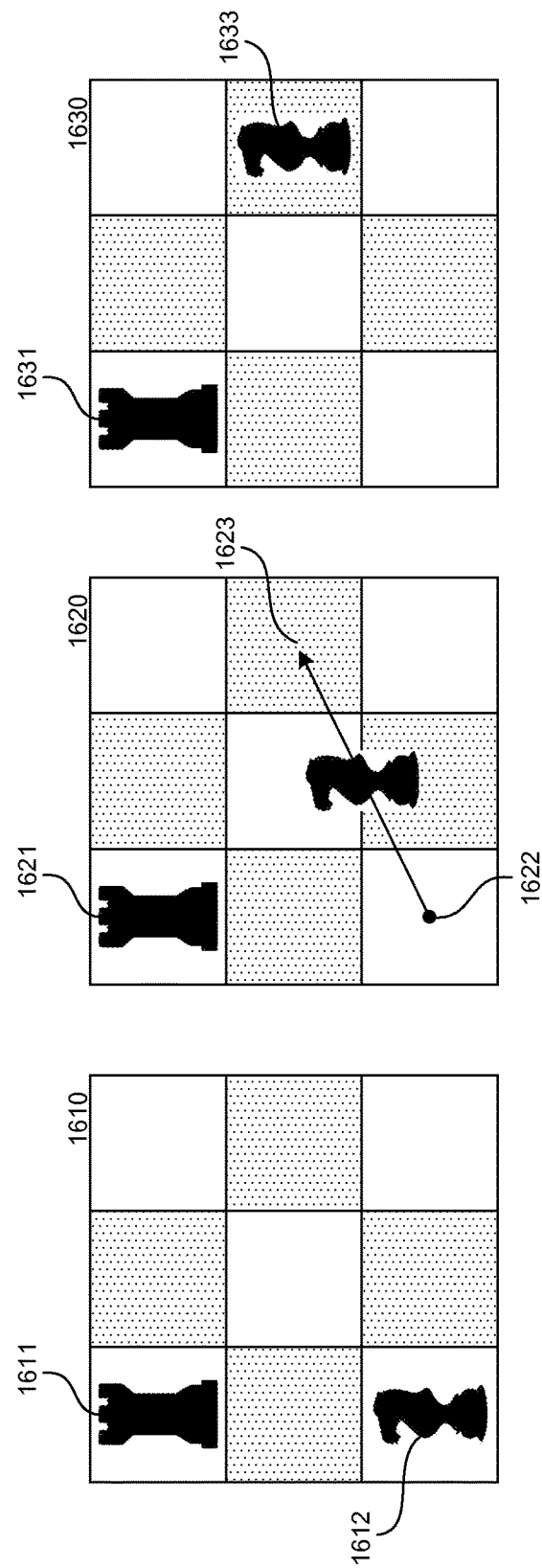
FIG. 16 illustrates the movement of a chess piece from a start location to a destination location.

FIG. 16 illustrates the movement of a chess piece from a start location to a destination location. The chess game application may generate a VDtree for the display area 1610 that includes a rook at location 1611 and a knight at start location 1612. When a chess player indicates to move the knight to a different location, the chess game application may generate a visual description tree for the display area 1630. The display area 1630 indicates that the rook is at the same location 1631, but that the knight has moved to destination location 1633. The layout engine generates a visual layout handle for the VLnode representing the knight that generates positioning information for each frame to effect the animation of the movement of the knight from start location 1612 to the destination location 1633. The display area 1620 illustrates the movement of the knight during the animation. The layout engine defines a path from location 1622 to location 1623 so that the rendering engine can animate the movement the knight as it renders successive frames into the graphics buffer.

Figure 17:
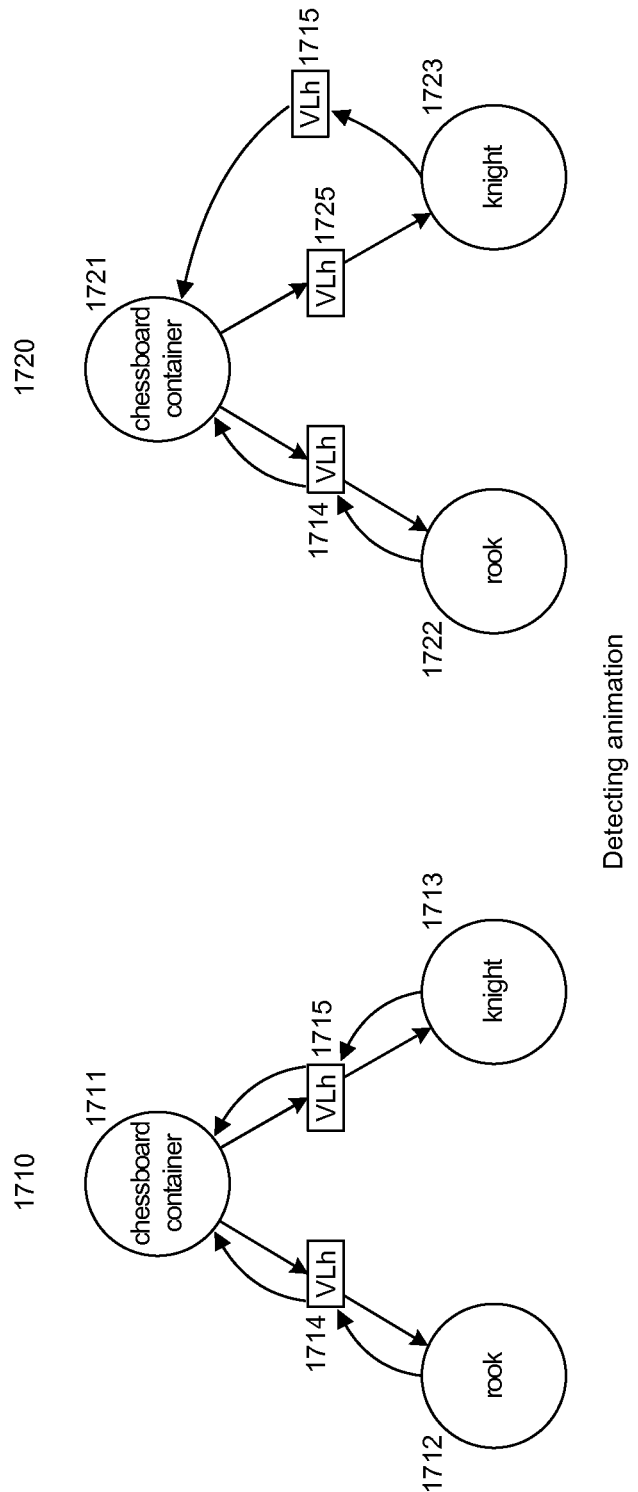
FIG. 17 is a block diagram that illustrates a change in location of a VLnode in support of animation in some embodiments.

The layout engine detects when a VLnode has been moved from a start location to a destination location based on inspection of the VLtree during an intermediate pass when generating the VLtree with the VLnode at the destination location. FIG. 17 is a block diagram that illustrates a change in location of a VLnode in support of animation in some embodiments. Subtree 1710 represents a portion of a VLtree for the display area 1610 and includes VLnodes 1711, 1712, and 1713. VLnode 1711 is of type container and contains each of the chess pieces. VLnode 1712 corresponds to the rook, and VLnode 1713 corresponds to the knight. VLnode 1711 points to visual layout handle ("VLh") 1714 and a visual layout handle 1715. The visual layout handle 1714 points to and contains positioning information for VLnode 1712 and points to VLnode 1711. The visual layout handle 1715 points to and contains the positioning information for VLnode 1713 and points to VLnode 1711. VLnodes 1712 and 1713 contain back pointers to the visual layout handles that point to them. Subtree 1720 represents a portion of the VLtree for display area 1620 and includes VLnodes 1721, 1722, and 1723, which correspond to VLnodes 1711, 1712, and 1713, respectively. Because the positioning information for the rook has not changed, VLnode 1721 points to the same visual layout handle 1714 as in subtree 1710. VLnode 1721, however, points a visual layout handle 1725 that is different from the visual layout handle 1715 of subtree 1710. Visual layout handle 1725 contains positioning information for the destination location 1633. After a visual layout handle for a VLnode is generated, the layout engine checks for a change in location and sets the back pointer to the visual layout handle. The layout engine detects that the back pointer for VLnode 1723 points to visual layout handle 1715, which is different from the visual layout handle 1725 that is currently pointing to it, indicating a change of position for VLnode 1723. If animation is enabled, the layout engine initializes a storyboard to generate a path from start location 1612 indicated in visual layout handle 1715 to the destination location 1622 indicated by visual layout handle 1725. The layout engine then sets the back pointer for VLnode 1723 to point to visual layout handle 1725. As subtree 1720 is repeatedly rendered for a sequence of frames, visual layout handle 1725 returns different positioning information in accordance with the path specified by the storyboard to effect the animation.

Figure 18:
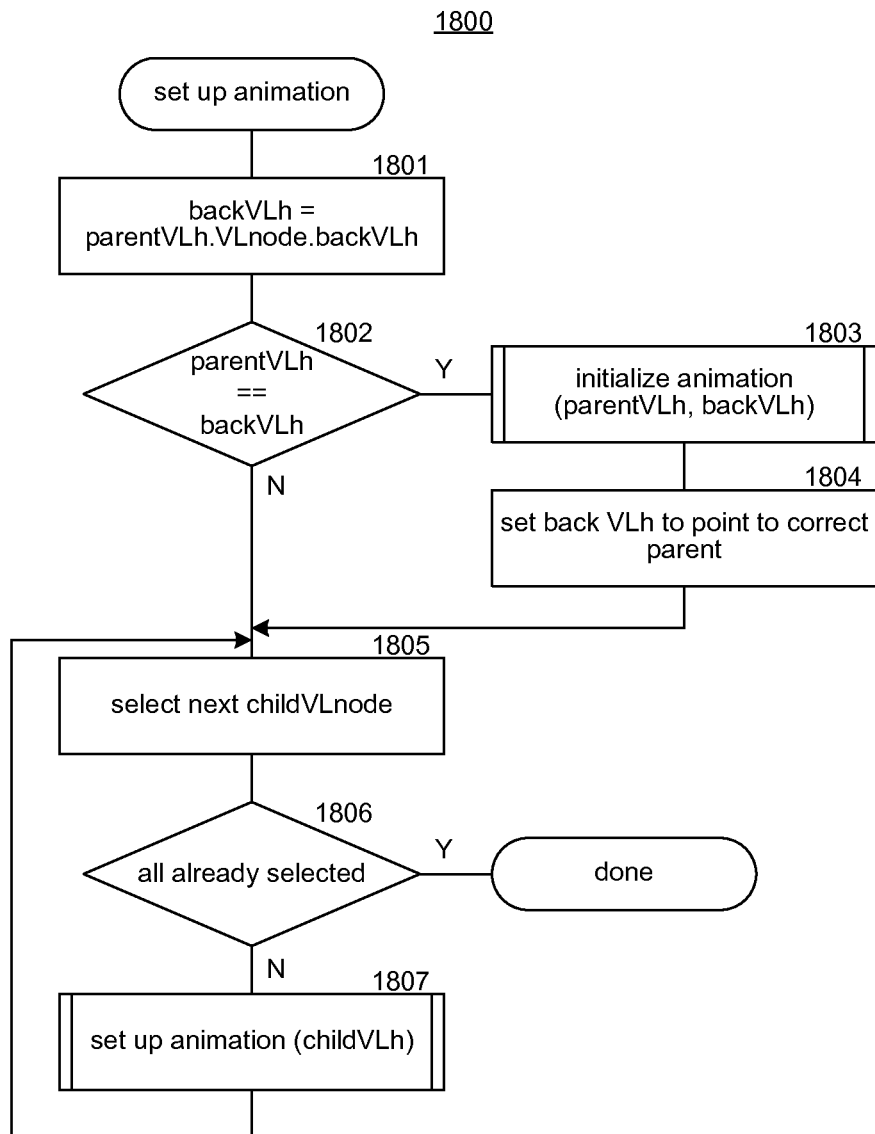
FIG. 18 is a flow diagram that illustrates processing of a set up animation pass of a VLtree in some embodiments.

FIG. 18 is a flow diagram that illustrates processing of a set up animation pass of a VLtree in some embodiments. The component 1800 is passed a parent visual layout handle for a VLnode and determines whether animation should be initialized for that VLnode and recursively invokes the component for child VLnodes of that VLnode. In block 1801, the component retrieves the back visual layout handle for that VLnode. In decision block 1802, if the back visual layout handle is the same as the parent visual layout handle, then the VLnode has not changed its location and the component continues at block 1805, else the VLnode has changed its location and the component continues at block 1803. In block 1803, the component invokes an initialize animation component passing an indication of the parent visual layout handle and the back visual layout handle. In block 1804, the component sets the back visual layout handle to point to the correct visual layout handle. In blocks 1805-1807, the component loops recursively invoking the set up animation component for each child VLnode. In block 1805, the component selects the next child VLnode. In decision block 1806, if all the child nodes have already been selected, then the component completes, else the component continues at block 1807. In block 1807, the component invokes the set up animation component passing an indication of the child visual layout handle and then loops to block 1805 to select the next child VLnode.

Figure 19:
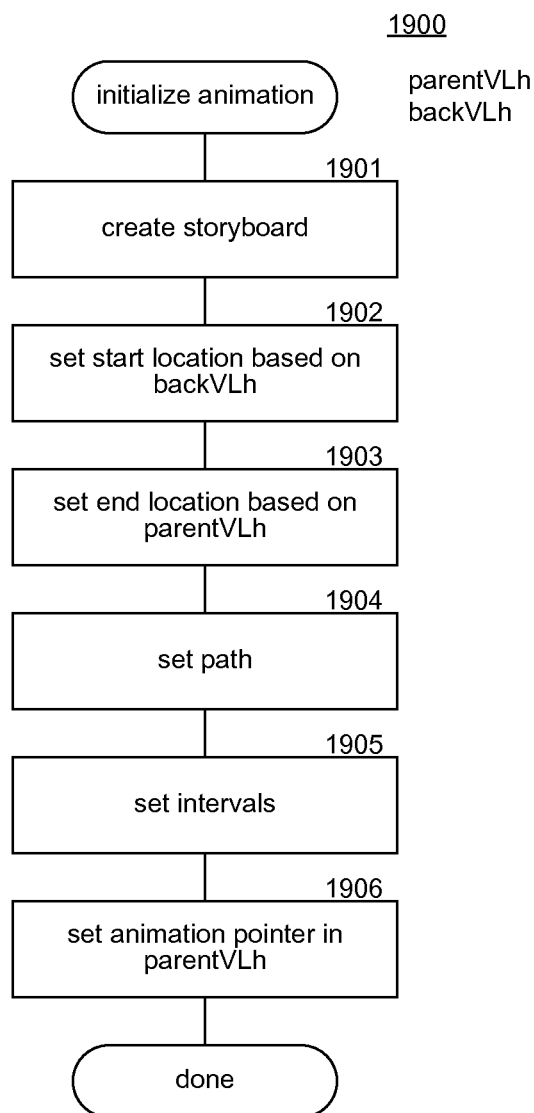
FIG. 19 is a flow diagram that illustrates processing of an initialize animation component in some embodiments.

FIG. 19 is a flow diagram that illustrates processing of an initialize animation component in some embodiments. The component 1900 is passed an indication of a parent visual layout handle and a back visual layout handle and initializes animation from the location of the back visual layout handle to the location of the parent visual layout handle. In block 1901, the component creates a storyboard. In block 1902, the component sets the start location of the storyboard based on the back visual layout handle. In block 1903, the component sets the destination location based on the parent visual layout handle. In block 1904, the component sets a path to follow when moving from the start location to the destination location. In block 1905, the component sets the number of intervals or frames that will be generated to show the animation along the path from the start location to the destination location. In block 1906, the component sets an animation pointer in the parent visual layout handle to point to the created storyboard and indicate that animation is enabled for the parent visual layout handle. The component then completes.

Figure 20:
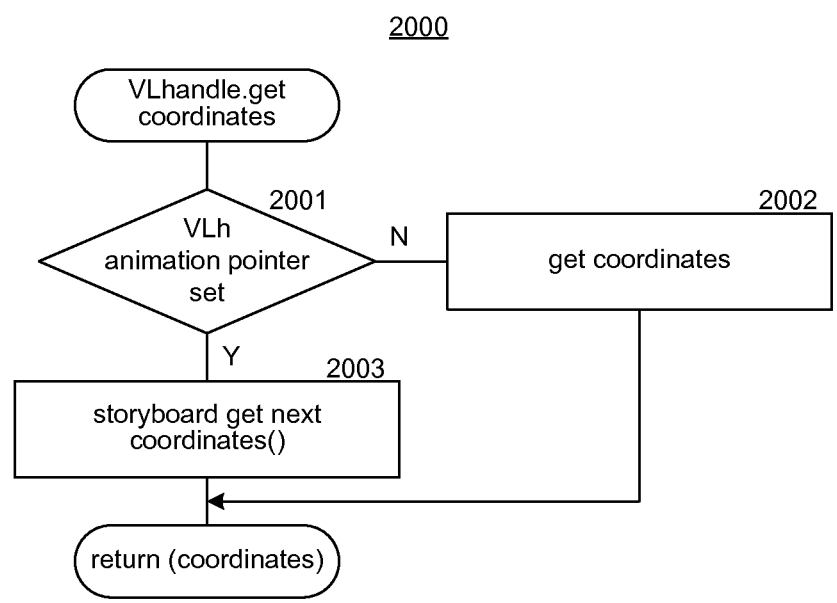
FIG. 20 is a flow diagram that illustrates the processing of a get coordinates component of a visual layout handle in some embodiments.

FIG. 20 is a flow diagram that illustrates the processing of a get coordinates component of a visual layout handle in some embodiments. The component 2000 is invoked by the rendering engine to retrieve the coordinates associated with a visual layout handle. In decision block 2001, if the visual layout handle has its animation pointer set, then the component continues at block 2003, else the component continues at block 2002. In block 2002, the component retrieves the static coordinates of the visual layout handle and then returns those coordinates. In block 2003, the component invokes a get next coordinates component of the storyboard for the visual layout handle to retrieve the next coordinates along the path from the start location to the destination location and then returns those coordinates.

The animation of a change in position from a start location to a destination location is somewhat more complex when the VLnode that changes position has a different parent. For example, when a chess piece is captured, the chess game application may move the chess piece from a location on the chessboard to a location off the chessboard in a captured pieces area. The corresponding VLtree may include a container for the pieces currently located within the chessboard and a container for the pieces that are currently captured. The moving of content from one container to another container is referred to as "re-parenting." Since content can be displayed only within the area of its parent container, the animation of movement from one parent container to a new parent container cannot readily be represented by placing the content in either the old parent container or the new parent container.

When the layout engine detects that a VLnode in the destination container has been re-parented, the layout engine sets a flag in the visual layout handle for that VLnode indicating that it has been re-parented. The layout engine also adds a temporary VLnode to the closest common ancestor VLnode of the start container and the destination container. The layout engine then initializes a storyboard to support the animation of the temporary VLnode from the start location to the destination location as described above. Because the coordinate space of the closest common ancestor VLnode encompasses the coordinate spaces of both the start container and the destination container, the visual layout handle can return a coordinate path that starts at the start location within the start container and ends at the destination location in the destination container. When the rendering engine detects that the VLnode within the destination container has been re-parented, it can suppress generating any content for that VLnode. At the end of the animation, the get coordinates component of the visual layout handle of the temporary node can remove the temporary VLnode and reset the re-parenting flag in the VLnode of the destination container so that the next rendering will be based on the VLnode being at its destination location within the destination container. In some embodiments, the layout engine may temporarily augment the VDtree to effect the animation by adding a temporary VDnode for the VDnode that has moved as a child of its original parent VDnode. During the animation process, the layout engine may successively move of the temporary VDnode up the path of ancestor VDnodes to the closest common ancestor and down the path of descendant VDnodes to it final location. In this way, as the animation progresses the VLtree can be regenerated based on characteristics of the current parent VDnode of the temporary VDnode.

Figure 21:
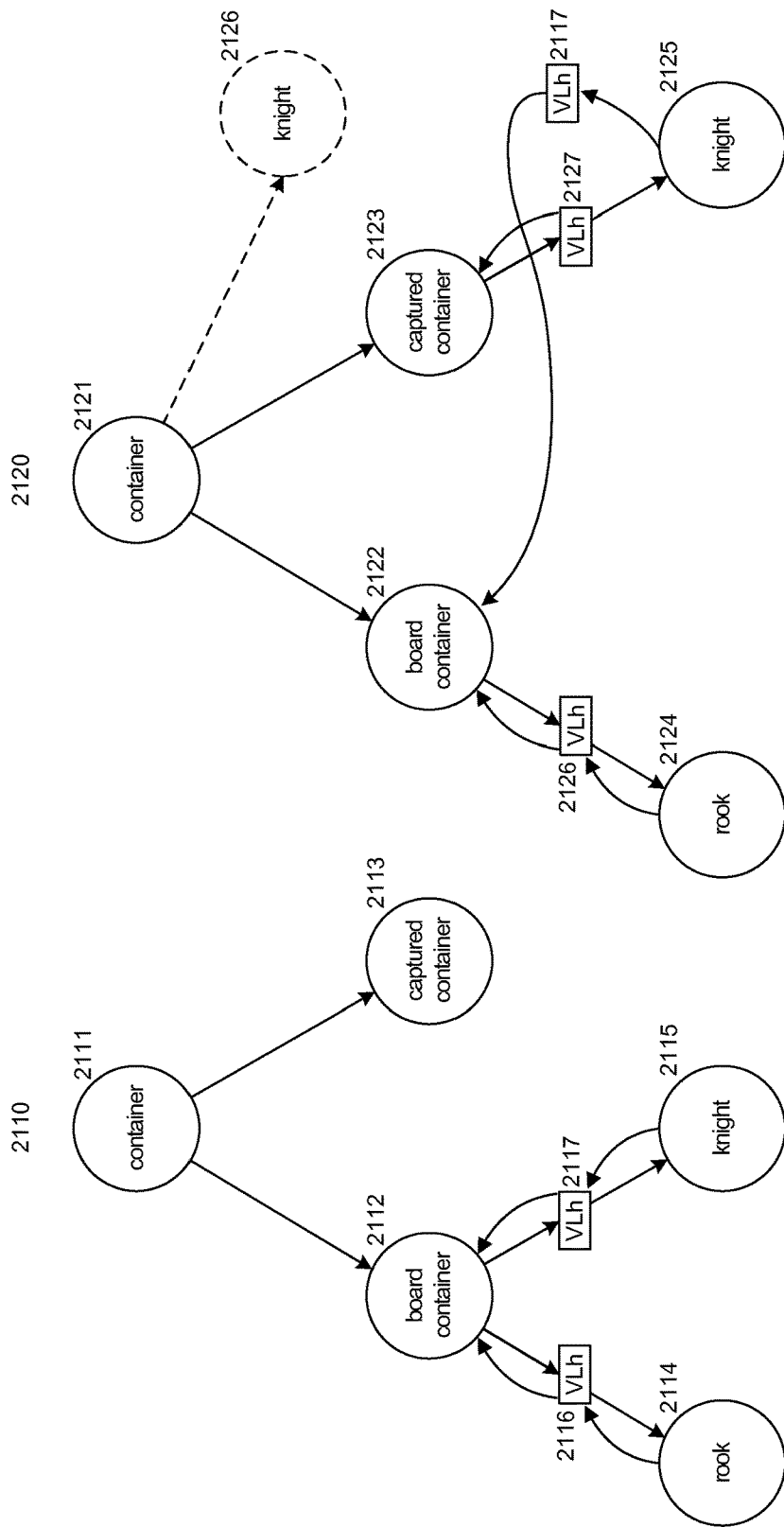
FIG. 21 is a diagram illustrating re-parenting of content in some embodiments.

FIG. 21 is a diagram illustrating re-parenting of content in some embodiments. Subtree 2110 of a VLtree represents chess pieces within a chessboard container. Subtree 2110 includes container VLnode 2111, chessboard container VLnode 2112, captured pieces container VLnode 2113, rook VLnode 2114, and knight VLnode 2115. The chessboard container VLnode 2112 contains a visual layout handle 2116 pointing to the rook VLnode 2114 and a visual layout handle 2117 pointing to the knight VLnode 2115. The rook VLnode 2114 contains a back pointer to visual layout 2116, and knight VLnode 2115 contains a back pointer to visual layout handle 2117. Subtree 2120 includes container VLnode 2121, chessboard container VLnode 2122, captured pieces container VLnode 2123, rook VLnode 2124, and knight VLnode 2125. Subtree 2120 illustrates that the knight VLnode 2125 has been moved from being a child of chessboard container VLnode 2112 to being a child of captured pieces container VLnode 2123. Captured pieces container 2123 includes visual layout handle 2127 that points to knight VLnode 2125. After initial processing, the back pointer of the knight VLnode 2125 points to the visual layout handle 2117, which in turn points to chessboard container VLnode 2112. The layout engine detects not only that the back pointer of knight VLnode 2125 no longer points to its current visual layout handle 2127 but also that the visual label handle 2117 points to a different parent VLnode as an indication of re-parenting. When the layout engine detects such re-parenting, the layout engine creates a temporary knight VLnode 2126 as a child VLnode of the closest common container, which is container VLnode 2121, and initializes a storyboard for generating a coordinate path from the start location within chessboard container VLnode 2122 to the destination location.

Virtualization

In some embodiments, the layout engine generates only as much of the VLtree as is needed to fill the display area. For example, a user reviewing a large document may review an index of figures within the document and request that a certain figure be displayed. In such a case, the layout engine may generate a VLtree that includes a VLnode for that figure and VLnodes for enough text to fill the display area above and below or to the left and right of the figure. Once the user selects the figure, the application may direct the layout engine to generate the VLtree with the center of that figure positioned at a certain position in the display area. The portion of the VDtree (e.g., center of the figure) that is to be positioned at the certain position of the display is referred to as the "anchor point" for the VLtree. An anchor point identifies an anchor VDnode and anchor coordinates within the coordinate space of the anchor VDnode. The process of generating only as much of the VLtree as is needed to fill a display area is referred to as "virtualization" because the VLtree for the entire document does not exist and is only virtually generated. In some embodiments, the VDtree may also be virtualized so that the application generates only those portions of the VDtree to support generating of the VLtree needed to render into a display area. When an Lobject for a VDnode attempts to retrieve a child VDnode, the layout engine may notify the application. The application can then generate the child VDnodes for return to the Lobject. Similarly, when the Lobject for a child VDnodes attempts to retrieve its child VDnode, the layout engine again notifies the application, which generates child VDnodes of the child VDnodes.

To facilitate the positioning of content, the layout engine may allow various points within content to be named, referred to as "named points." The layout engine may recognize a set of named points relating to the bounding rectangle or measured size of content. For example, the named points may include upper left, upper center, upper right, middle left, center, middle right, lower left, lower center, and lower right points of the bounding rectangle or measured size of the content. The various types of VDnodes may also define custom-named points that are specific to the content of that type. For example, if the content is of type stick figure for representing a stick figure of a person, the stick figure type may have a custom-named point of "nose" corresponding to the position of the nose within the bounding rectangle or measured size of the stick figure. When the layout engine queries the Lobject for the stick figure coordinates for the named point of "nose," the Lobject returns the coordinates of the nose within the coordinate space of the stick figure.

Figure 22:
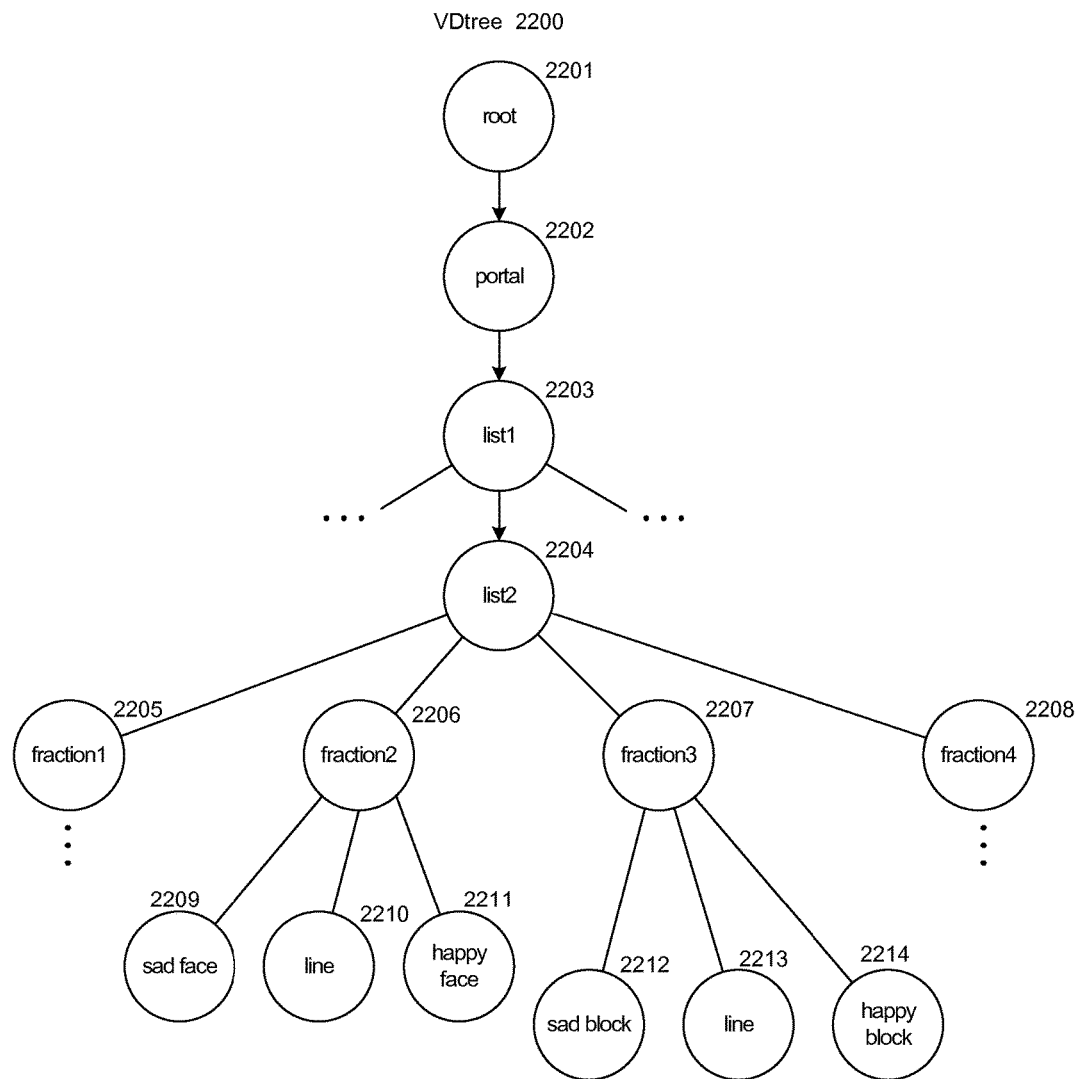
FIG. 22 is a diagram that illustrates an example visual description tree with a named point.
Figure 23:
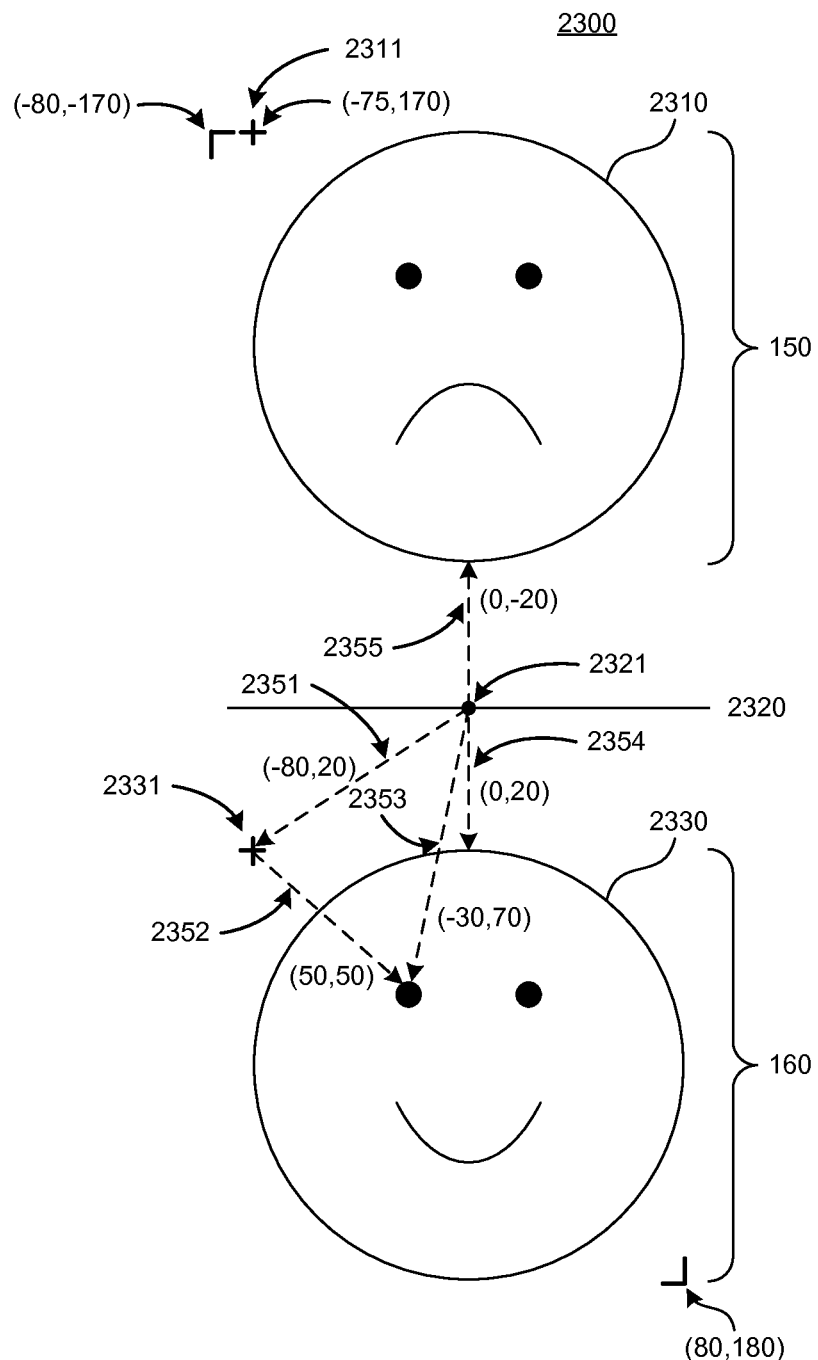
FIG. 23 is a diagram that illustrates a fraction with a non-numeric numerator and denominator.

When an application requests to display a certain anchor point at a certain location on the display, the application provides the anchor point and the location to the layout engine. From the anchor point, the layout engine can identify a path of VDnodes from the root to the anchor VDnode. The layout engine directs the invoking of the Lobjects for the VDnodes along that path. FIG. 22 is a diagram that illustrates an example visual description tree with a named point. VDtree 2200 includes VDnodes 2201-2214 representing a document with a list as an item within an outer list. The inner list contains "fraction" items. A fraction includes a numerator, a line, and a denominator. In this example, the numerator and denominator are non-numeric images (e.g., a happy face). FIG. 23 is a diagram that illustrates a fraction with a non-numeric numerator and denominator. The fraction 2300 corresponds to VDnode 2206 and includes a sad face 2310 as the numerator, a line 2320, and a happy face 2330 as a denominator. The VDnode 2211 is of type happy face and has a custom-named point of "right eye." When the Lobject for a happy face is queried for the coordinates for the name point "right eye," it returns the coordinates of the right eye of the happy face within the coordinate space of the happy face. For example, the happy face 2330 may have the origin of its coordinate space at the upper left corner 2331 of its bounding rectangle or measured size. The right eye is located at location (50, 50) within the coordinate space of the happy face. The fraction 2300 considers its origin to be at the center 2321 of line 2320 and its coordinates of its bounding rectangle or measured size to be (−80, −170) and (80, 180). The numerator 2310 considers its origin to be at the upper left corner 2311 of its bounding rectangle or measured size, the line 2320 considers its origin to be at the center 2321, and the denominator 2330 considers its origin to be at the upper left corner 2331. The bounding rectangle or measured size of the denominator 2310 is a square of size 150 by 150, and the bounding rectangle or measured size of the numerator 2330 is a square of size 160 by 160. Vector 2354 indicates that the fraction 2300 positioned the denominator 2330 with its upper center point to be at (0, 20) within the coordinate space of the fraction 2300. Vector 2355 indicates that the fraction 2300 positioned the numerator 2310 with its lower center point to be at (0, −20) within the coordinate space of the fraction 2300. Vector 2351 indicates that the origin of the denominator 2330 is at (−80, 20) within the coordinate space of the fraction 2300. Vector 2352 indicates that the right eye of the denominator 2330 is at (50, 50) within the coordinate space of the denominator 2330. Vector 2353 indicates that the right eye of the denominator 2330 is at (−30, 70) within the coordinate space of fraction 2300.

Figure 24:
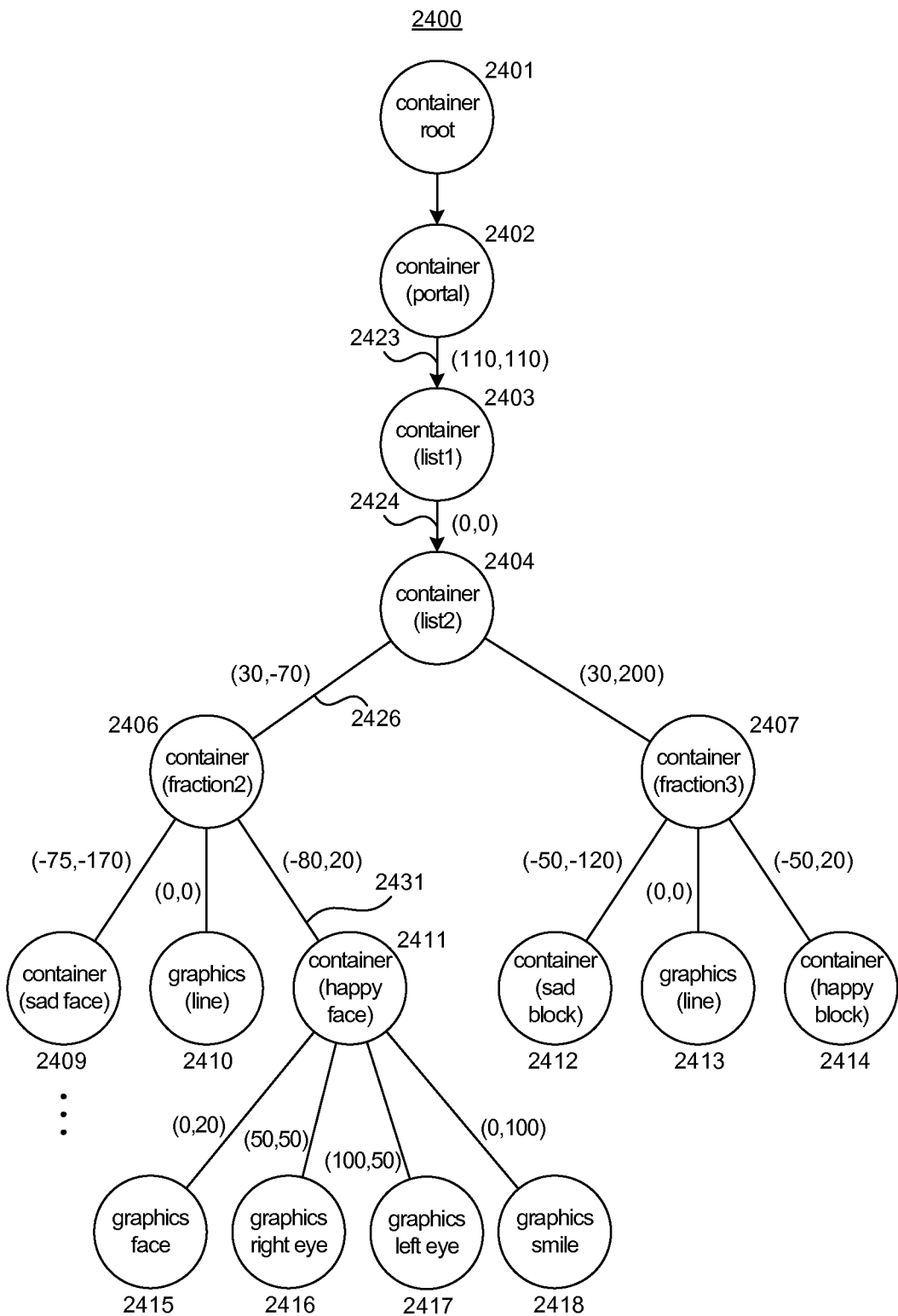
FIG. 24 is a diagram that illustrates an example VLtree generated for the VDtree.

An application may request the layout engine to display the anchor point that is the right eye of the happy face at a certain location such as (110, 110) within the display area. FIG. 24 is a diagram that illustrates an example VLtree generated for the VDtree. The VLtree 2400 includes VLnodes 2401-2418. The links between the VLnodes represent visual layout handles that are annotated to show the positioning information of the visual layout handles. For example, the positioning information for visual layout handle 2423 is (110, 110). The visual layout handle 2423 indicates to render the origin of VLnode 2403 at (110, 110) within the coordinate space of VLnode 2402. The visual layout handle 2424 indicates to render the origin of VLnode 2404 at (0, 0) within the coordinate space of VLnode 2403. The visual layout handle 2426 indicates to render the origin of VLnode 2406 at (30, −70) within the coordinate space of VLnode 2404. The visual layout handle 2431 indicates to render the origin of VLnode 2411 at (−80, 20) within the coordinate space of VLnode 2406. The visual layout handle 2436 indicates to render the origin of VLnode 2416 at (50, 50) within the coordinate space of VLnode 2411.

When rendering the VLtree, the rendering engine traverses the VLtree requesting each VLnode to render its content with its origin at a certain location within the display area. The rendering engine requests VLnode 2403 to render its content with its origin at (110, 110) within the coordinate space of VLnode 2402. The rendering engine requests VLnode 2404 to render its content with its origin positioned at (110, 110), that is, the sum of (110, 110) and the position information (0, 0). The rendering engine requests VLnode 2406 to render its content with its origin positioned at (140, 40), that is, the sum of (110, 110) and positioning information (30, −70). The rendering engine requests VLnode 2411 to render its content with its origin position at (50, 50), that is, the sum of (130, 30) and positioning information (−80, 20).

Figure 25:
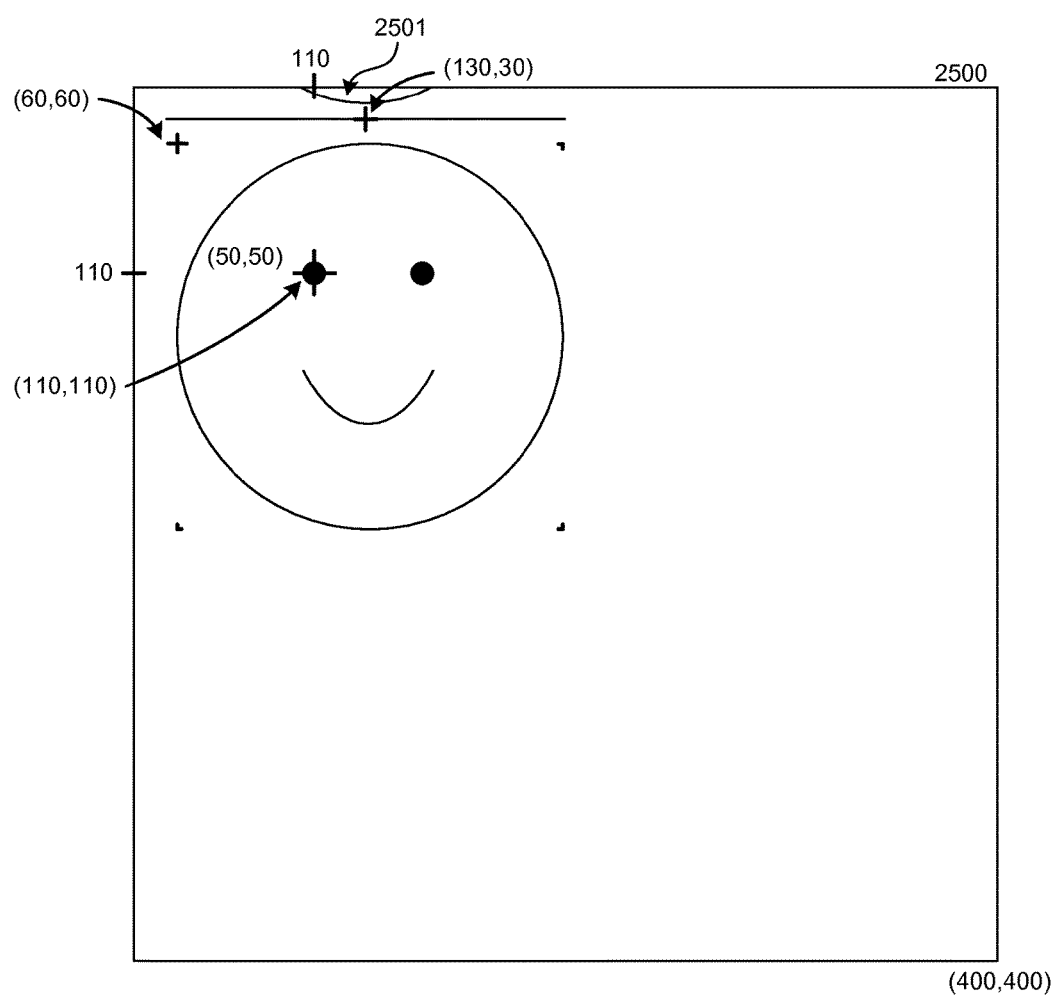
FIG. 25 is a diagram that illustrates the rendering of the fraction in the display area.

FIG. 25 is a diagram that illustrates the rendering of the fraction in the display area. The display area 2500 has the origin of the fraction positioned at (130, 30), which results in the origin of the denominator being at (50, 50), which results in the right eye being at (110, 110)—the requested location of the anchor point within the display. Because of the positioning of the right eye, only a small portion 2501 of the numerator is rendered in the display area.

The layout engine generates the VLtree 2400 as follows. The Lobject corresponding to the portal VDnode 2202, which is along the path to the named point, is invoked along with an indication that the anchor point is to be at (110, 110) within its coordinate space. Since list VDnode 2203 is along the path to the anchor point, the layout engine is directed to invoke the Lobject for VDnode 2203 passing an indication that the anchor point is to be at (100, 100) within the coordinate space of the VDnode 2202. The layout engine invokes the Lobject for VDnode 2203 passing an indication that the anchor point is to be at (0, 0) within the coordinate space of VDnode 2203. When the invocation for the Lobject for VDnode 2203 returns, the layout engine sets the layout handle for the VLnode 2403 in the VLtree to be positioned at (100, 100), which is within the coordinate space of VLnode 2402.

After invoking the Lobject for VDnode 2203, the layout engine invokes the Lobject for VDnode 2204 passing an indication that the anchor point is to be at (0, 0) with the coordinate space of VDnode 2203. When the invocation for the Lobject for VDnode 2204 returns, the layout engine sets the layout handle for the VLnode 2403 in the VLtree to be positioned at (0, 0), which is within the coordinates space of VLnode 2403.

After invoking the Lobject for VDnode 2204, the layout engine invokes the Lobject for VDnode 2206 passing an indicating that the anchor point is to be at (0, 0) within the coordinate space of VDnode 2204. The Lobject VDnode 2206 eventually requests the layout engine to invoke the Lobject for VDnode 2211 and positions the origin of VLnode 2411 at (−80, 20) within the coordinate space of VLnode 2406. When the invocation for the Lobject for the VLnode 2406 returns, the layout engine has determined that the anchor point is at (−30, 70) within the coordinate space of VLnode 2404. The layout engine sets the layout handle for VLnode 2406 to be positioned at (30, −70) within the coordinate space of VLnode 2404. The net effect of the positioning will be that the anchor point is at (0, 0) within the coordinate space of VLnode 2404.

After invoking the Lobject for VDnode 2206, the layout engine eventually invokes the Lobject for VDnode 2211 to generate its VLnodes. Since the VDnode 2211 contains the anchor point, the layout engine also queries the Lobject for VDnode 2211 for the position of its right eye within the coordinate space of VDnode 2211, which is (50, 50). When the invocation of the Lobject for VDnode 2211 returns, the layout engine sets the layout handle for VLnode 2411 to (−80, 20) within the coordinate space of VLnode 2406. The layout engine also determines that the anchor point is at (−30, 70) within the coordinate space of VLnode 2406, that is, the sum of (−80, 20) and (50, 50). As discussed above, the layout engine uses this position of the anchor point to set the positioning information in the layout handle for VLnode 2406 so that the anchor point is positioned at (0, 0) within the coordinate space of VLnode 2404.

In the example of FIGS. 22-25, the Lobjects for the list VDnodes support virtualization, but the other Lobjects do not. When the Lobject for VDnode 2206 returns, it returns the size of its bounding rectangle or measured size. The bounding rectangle or measured size of fraction 2300 may be represented by the coordinates of (−80, 170) and (80, 180) within the coordinate space of fraction 2300 corresponding to the upper left corner and the lower right corner. Since the position of the VLnodes results in the origin of fraction 2300 being positioned at (130, 30) within the display area, the layout engine informs the Lobject for VDnode 2204 that there is no room in the display area above fraction 2300, but there is room in the display area below fraction 2300 as illustrated by FIG. 25. Since the Lobject for VDnode 2204 supports virtualization, after generating the VLnodes to support rendering the anchor point, it can then request the Lobjects for its other child VDnodes to generate their VLnodes. If there was room at the top of the display area, the Lobject for VDnode 2204 would request invocations for child VDnodes starting with the VDnode immediately to the left of VDnode 2206 and proceeding to the left until the display area is filled to the top. Since there is room at the bottom of the display area, the Lobject for VDnode 2204 requests invocations for child VDnodes starting with the VDnode immediately to the right of VDnode 2206 and proceeding to the right until the display area is filled to the bottom.

In some embodiments, the layout engine may allow an anchor point to anchor the x-coordinate to a named point of one VDnode and the y-coordinate to a named point of another VDnode to a specific location in the display area. In the example of FIG. 22, an application may specify that the left side of VDnode 2206 is to be positioned at the x-coordinate of 10 in the display area and that the right eye of VDnode 2214 is to be positioned at the y-coordinate of 110. Lobjects may participate in virtualization and take into consideration the application's specification when choosing their own coordinate systems. Lobjects may, at their own discretion or under the direction of formatting child nodes, add spacing between children or between children and the edge of the allotted display area. The Lobject for VDnode 2202 may specify the placement of its child VDnode 2203 in its local coordinate space such that the left side of VDnode 2206 is positioned at the x-coordinate of 10 and that the right eye of VDnode 2214 is positioned at the y-coordinate of 110. The Lobject for VDnode 2203 may specify the placement of its child VDnode 2204 in its local coordinate space such that the left side of VDnode 2205 is positioned at the x-coordinate of 15 (which includes a horizontal margin) and that the right eye of VDnode 2214 is positioned at the y-coordinate of 0 (which does not include a vertical margin).

In some embodiments, a VDtree is annotated to indicate which VDnodes have been modified so that the VLtree can be regenerates based on the VDnodes that have been modified. A VDnode that has been modified is annotated as being modified, and a VDnode that has not been modified, but has a descendant VDnode that has being modified, is annotated as having a modified descendant. When a VDnode is annotated as having been modified, then the layout engine regenerates the subtree of the VLtree corresponding to that VDnode. When a VDnode is annotated as having a modified descendant, the layout engine can determine whether regenerate the entire subtree of the VLtree corresponding to that VDnode or to regenerate subtrees for certain child VDnodes. The Lobject for the VDnode can decide which child VDnodes need to be regenerated. Even if the subtree for a child VDnode need not be regenerated, the layout engine may need to modify the positioning information of the layout handle for the child VDnode. For example, if the size of a child VDnode within a list is changed, the positioning information in the layout handle for child VDnodes further down on the list may need to be changed.

Figure 26:
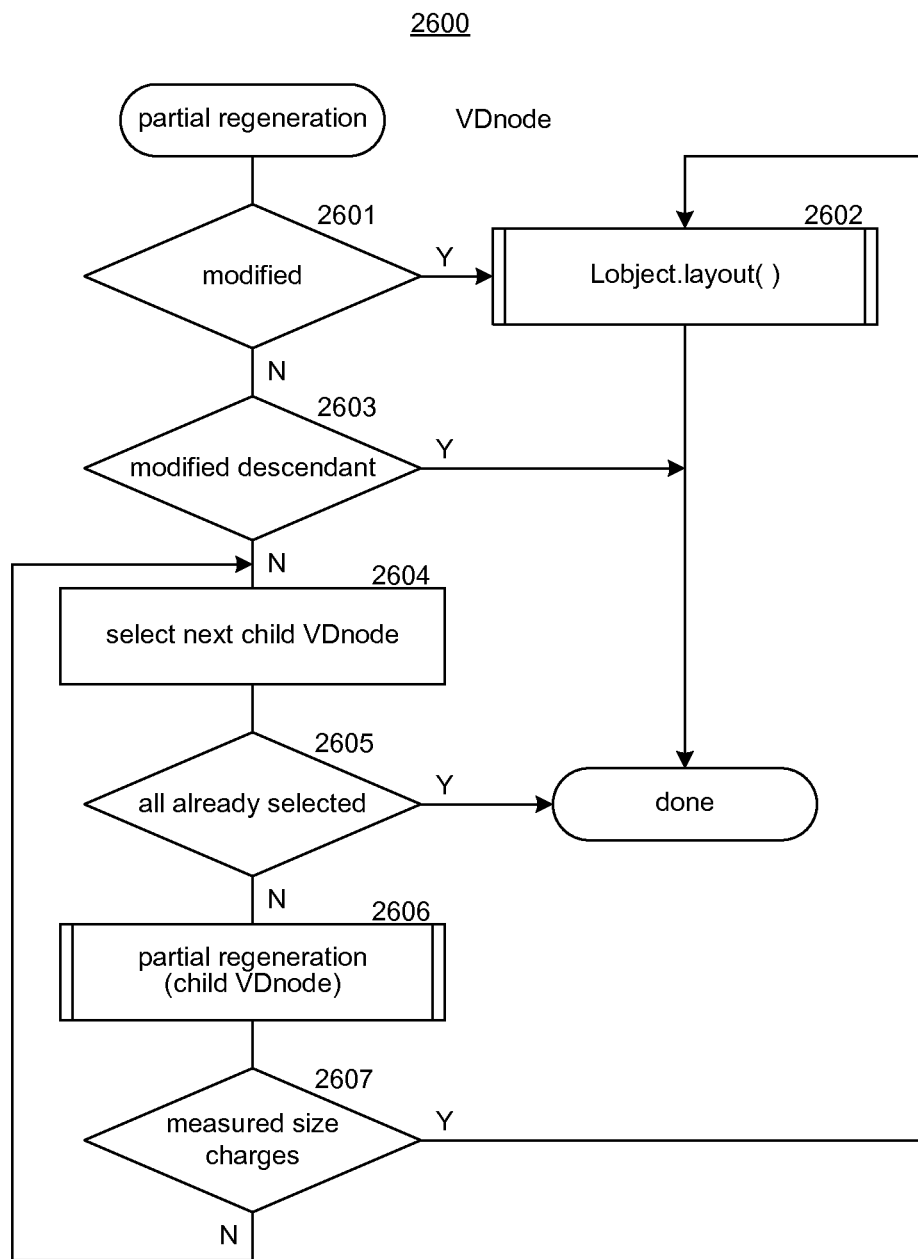
FIG. 26 is a flow diagram that illustrates the processing of a partial regeneration component in some embodiments.

FIG. 26 is a flow diagram that illustrates the processing of a partial regeneration component in some embodiments. The component 2600 is passed an indication of a VDnode and determines whether to regenerate the corresponding subtree of the VLtree and subtrees for any of its child VDnodes. In decision block 2601, if the VDnode is annotated as being modified, the component continues at block 2602, else the component continues at block 2603. In block 2602, the component invokes the layout component of the Lobject for the VDnode to regenerate the corresponding subtree in the VLtree and then completes. In decision block 2603, if the VDnode is annotated as having a modified descendant, the component continues at block 2604, else the component completes. In blocks 2604-2607, the component loops recursively invoking the component. In block 2604, the component selects the next child VDnode. In decision block 2605, if all the child VDnodes have already been selected, then the component completes, else the component continues at block 2606. In block 2606, the component recursively invokes the partial regeneration component passing an indication of the selected child VDnode. In decision block 2607, if the measured size of the regenerated child VLnode has changed, then the component continues at block 2602 to regenerate the entire corresponding subtree in the VLtree for the parent VDnode, else the component loops to block 2604 to select the next child VDnode. If the measured size of a VLnode changes, then the positioning information and measured size for sibling child VLnode may change.

An Lobject may provide behavior that allows additional content to be temporarily added to VDtree. For example, a VDtree may include a VDnode for a paragraph that is resizable. The Lobject for that type of VDnode may support the resizing of the paragraph by temporarily adding a VDnode, for each of the corners, representing a graphical user interface widget that when selected can be moved to resize the paragraph in either one dimension or both dimensions. The layout engine processes the temporarily added VDnodes by generating corresponding VLnodes for the widgets. As the widgets are moved, the size of the display area in which the paragraph changes and the application regenerates the portions of the VDtree affected by the change in size. The layout engine then regenerates the VLtree, which is then rendered.

In some embodiments, the same content may be displayed in multiple display areas simultaneously. For example, a slide presentation may have the same header displayed on each slide. In such a case, a VDtree for the presentation may include a VDnode corresponding to the presentation that has a child VDnode representing the header for the presentation and a child VDnode the non-header content. When multiple slides are displayed simultaneously, the header is displayed multiple times. When the header is selected in a displayed slide, the application may provide the behavior of one type of highlighting for the selected portion within the selected slide and a different type of highlighting for the selected portion in each of the other displayed slides. Thus, the hit testing identifies not only the portion of the header that is selected, but also the selected slide. The Lobject for the presentation may generate a temporary VDnode for each of the slides representing the content of the header. The layout engine will generate a corresponding VLnode for each of the temporary VDnodes. When the header is selected, the VLnode corresponding to the header of the selected slide is identified and provided to the application. The non-temporary VDnode representing the header may have a child node indicating "primary" and "secondary" selection highlighting or styling, as well as an indication of which of the copies is the "primary," such that the Lobject can produce the correctly styled VDnode for each copy.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method performed by a computing device for generating a visual layout tree for a visual description tree of a document whose content is to be rendered, the visual description tree describing content of the document along with formatting and logical arrangement of content, the visual description tree having visual description nodes representing a hierarchical organization of content of the document, each visual description node having a type, the method comprising:
   for each type of a visual description node, providing a corresponding layout object that generates one or more visual layout nodes indicating the layout for rendering content represented by the visual description node of that type; and
   performing a depth first traversal of the visual description tree by:
   for each visual description node that is encountered, processing that visual description node by:
      determining the type of that visual description node, wherein the type comprises a document organizational unit, wherein the document organizational unit is one of a root, portal, horizontal list, vertical list, chapter, index, page, paragraph, text, image, graph, map, or footnote;
      instantiating the corresponding layout object for the determined type, the corresponding layout object comprising a function that implements behavior for generating the one or more visual layout nodes for that visual description node;
      invoking the function of the corresponding layout object to generate the one or more visual layout nodes of the visual layout tree for rendering content represented by that visual description node, the visual layout nodes arranged hierarchically and defining the layout of the document within a display area; and
      for each child visual description node of that visual description node, recursively processing that child visual description node.

2. The method of claim 1 wherein a visual description node representing an element of the content has a child visual description node that defines formatting of the element.

3. The method of claim 1 wherein the visual layout tree includes a subtree corresponding to each display area in which a portion of the content is to be rendered.

4. The method of claim 1 including generating from the visual layout tree a graphics buffer with pixels representing the layout of the document.

5. The method of claim 4 including outputting the graphics buffer.

6. The method of claim 1 wherein a visual layout node is referenced by a handle that includes a reference to the visual layout node and positioning information.

7. The method of claim 6 wherein the positioning information indicates location of content of the visual layout node within a coordinate system of a parent visual layout node so that the location can be changed without having to recreate the visual layout node.

8. The method of claim 1 wherein when performing the traversal of the visual description tree, generating a layout interruption record to track state when laying out of a visual description node is interrupted as a result of content of the visual description node not fitting within a display area.

9. The method of claim 1 including when the document is modified, regenerating by an application portions of the visual description tree affected by the modification.

10. The method of claim 9 including after the application regenerates portions of the visual description tree affected by the modification, regenerating visual layout nodes of the visual layout tree.

11. The method of claim 9 wherein the regenerating by the application includes the application annotating visual description nodes that have been modified as being modified.

12. The method of claim 11 wherein regenerating by the application further includes annotating a visual description node that has not been modified but that has descendant visual description node that has been modified as having a modified descendant.

13. The method of claim 1, wherein during the determining the type of that visual description node, a visual description node encountered during the depth first traversal of the visual description tree is determined to be of type paragraph, the corresponding layout object being a layout object for a paragraph.

14. The method of claim 1, wherein during the determining the type of that visual description node, a visual description node encountered during the depth first traversal of the visual description tree is determined to be of type text, the corresponding layout object being a layout object for text.

15. The method of claim 14, wherein invoking the function of the layout object for text generates glyphs for the text of that visual description node; generates a visual layout node of type graphical object for the visual layout tree; and adds a reference to the glyphs to the visual layout node of the type graphical object.

16. A computer-readable storage medium storing computer-executable instructions for controlling a computing device to generate a visual layout tree for a visual description tree of a document whose content is to be rendered, the computer-executable instructions comprising instructions of:
layout objects that generate one or more visual layout nodes indicating the layout for rendering content represented by a visual description node of a certain type, each layout object comprising a function that implements behavior for generating the one or more visual layout nodes for the visual description node of the certain type corresponding to that layout object, wherein the certain type comprises a document organizational unit, wherein the document organizational unit is one of a root, portal, horizontal list, vertical list, chapter, index, page, paragraph, text, image, graph, map, or footnote; and
a component that processes the visual description tree by processing some of the visual description nodes by:
determining the certain type of that visual description node; and
invoking the function of the layout object for the determined type to generate the one or more visual layout nodes of the visual layout tree for rendering content represented by that visual description node.

17. The computer-readable storage medium of claim 16 wherein the component that processes further, by for each child visual description node of a visual description node, recursively processing that child visual description node.

18. The computer-readable storage medium of claim 16 wherein a visual description node representing an element of the content has a child visual description node that defines formatting of the element.

19. The computer-readable storage medium of claim 16 wherein the visual layout tree includes a subtree corresponding to each display area in which a portion of the content is to be rendered.

20. The computer-readable storage medium of claim 16 wherein the computer-executable instructions further include a component that generates from the visual layout tree a graphics buffer with pixels representing the layout of the document.

21. The computer-readable storage medium of claim 20 wherein the computer-executable instructions further include a component that outputs the graphics buffer.

22. The computer-readable storage medium of claim 16 wherein a visual layout node is referenced by a handle that includes a reference to the visual layout node and positioning information.

23. The computer-readable storage medium of claim 22 wherein the positioning information indicates location of content of the visual layout node within a coordinate system of a parent visual layout node so that the location can be changed without having to recreate the visual layout node.

24. The computer-readable storage medium of claim 16 wherein the component that traverses of the visual description tree generates a layout interruption record to track state when laying out of a visual description node is interrupted as a result of content of the visual description node not fitting within a display area.

25. The computer-readable storage medium of claim 16 wherein the component that processes further, when a portion of the visual description tree is regenerated, processes the portion of the visual description node affected by the regeneration.

26. A computing device for generating a visual layout tree for a visual description tree of a document whose content is to be rendered, the computing device comprising:
a computer-readable storage medium storing computer-executable instructions of:
layout objects that generate one or more visual layout nodes indicating the layout for rendering content represented by a visual description node of a certain type, each layout object comprising a function that implements behavior for generating the one or more visual layout nodes for the visual description node of the certain type corresponding to that layout object, wherein the certain type comprises a document organizational unit, wherein the document organizational unit is one of a root, portal, horizontal list, vertical list, chapter, index, page, paragraph, text, image, graph, map, or footnote; and
a component that encounters visual description nodes of the visual description tree and for each visual description node that is encountered,
determines the certain type of that visual description node; and
invokes the function of the layout object for the determined type to generate the one or more visual layout nodes of the visual layout tree for rendering content represented by that visual description node; and
a processor that executes the computer-executable instructions stored in the computer-readable storage medium.

27. The computing device of claim 26 wherein the component that traverses further for each child visual description node of a visual description node, determines a type of that child visual description node and invokes the layout object for that determined type.

28. The computing device of claim 26 wherein the computer-readable storage medium further stores computer-executable instructions of a component for generating from the visual layout tree a graphics buffer with pixels representing the layout of the document.

29. The computing device of claim 26 wherein the component that encounters further, when a portion of the visual description tree is regenerated, for each visual description node affected by the regeneration:
determines the type of that visual description node; and
invokes the layout object for the determined type to generate one or more visual layout nodes of the visual layout tree for rendering content represented by that visual description node.

30. The computing device of claim 29 wherein the visual description nodes affected by the regeneration are annotated as be modified by an application that regenerates the visual description nodes.

* * * * *